(12) United States Patent
Akahane et al.

(10) Patent No.: US 8,259,718 B2
(45) Date of Patent: Sep. 4, 2012

(54) NETWORK RELAY APPARATUS

(75) Inventors: Shinichi Akahane, Hachioji (JP); Teruo Kaganoi, Yokohama (JP); Tetsuya Nagata, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 242 days.

(21) Appl. No.: 12/829,735

(22) Filed: Jul. 2, 2010

(65) Prior Publication Data
US 2011/0002337 A1    Jan. 6, 2011

(30) Foreign Application Priority Data

Jul. 3, 2009    (JP) .................................. 2009-158953

(51) Int. Cl.
*H04L 12/28* (2006.01)
(52) U.S. Cl. ........................ 370/389; 370/392; 370/401
(58) Field of Classification Search .................. None
See application file for complete search history.

(56) References Cited

U.S. PATENT DOCUMENTS

| 7,760,667 | B2* | 7/2010 | Nishimura et al. | 370/255 |
| 7,843,812 | B2* | 11/2010 | Kobatake | 370/222 |
| 7,920,567 | B2* | 4/2011 | Seto et al. | 370/392 |
| 2005/0169270 | A1* | 8/2005 | Mutou et al. | 370/390 |
| 2008/0037558 | A1* | 2/2008 | Kawakami | 370/395.53 |

FOREIGN PATENT DOCUMENTS

JP    2004-297475    10/2004

* cited by examiner

*Primary Examiner* — Duc C Ho
(74) *Attorney, Agent, or Firm* — Antonelli, Terry, Stout & Kraus, LLP.

(57) ABSTRACT

Network relay arrangements including: multiple ports; MAC address storage; flooding indication storage; plane number management storage; table manager; and frame processor. The table manager: utilizes the plane number management storage to specify current identification information being currently used and next identification information to be used next, with regard to a preset element of the key item for identifying a target of deletion of the information of correlating the transmit port to the MAC address from the MAC address storage; sets the requirement of the flooding operation in registry of a certain information group in the flooding indication storage having the preset element and being correlated to the current identification information; and sets the non-requirement of the flooding operation in registry of a certain information group in the flooding indication storage having the preset element and being correlated to the next identification information.

7 Claims, 20 Drawing Sheets

Fig.2A

PLANE NUMBER
MANAGEMENT TABLE

| PORT NUMBER :FMPT | ACTIVE PLANE NUMBER :FMNO |
|---|---|
| P101 | 0 |
| P112 | 0 |
| P113 | 0 |

MAC ADDRESS TABLE

| MAC ADDRESS :MMA | PLANE NUMBER :MFO | PORT NUMBER :MPT |
|---|---|---|
| M1 | 0 | P101 |
| M2 | 0 | P112 |
| M3 | 0 | P112 |
| M4 | 0 | P113 |

FLOODING INDICATION TABLE

| PLANE NUMBER :FFO | PORT NUMBER :FPT | FLOODING INDICATION :FIN |
|---|---|---|
| 0 | P101 | – |
| 0 | P112 | – |
| 0 | P113 | – |
| 1 | P101 | FLD |
| 1 | P112 | FLD |
| 1 | P113 | FLD |
| 2 | P101 | FLD |
| 2 | P112 | FLD |
| 2 | P113 | FLD |
| ... | ... | ... |

PLANE NUMBER
MANAGEMENT TABLE

| PORT NUMBER :FMPT | ACTIVE PLANE NUMBER :FMNO |
|---|---|
| P101 | 0 |
| P112 | 0 |
| P113 | 0 |

MAC ADDRESS TABLE

| MAC ADDRESS :MMA | PLANE NUMBER :MFO | PORT NUMBER :MPT |
|---|---|---|
| M1 | 0 | P101 |
| M2 | 0 | P112 |
| M3 | 0 | P112 |
| M4 | 0 | P113 |

FLOODING INDICATION TABLE

| PLANE NUMBER :FFO | PORT NUMBER :FPT | FLOODING INDICATION :FIN |
|---|---|---|
| 0 | P101 | - |
| 0 | P112 | FLD |
| 0 | P113 | FLD |
| 1 | P101 | FLD |
| 1 | P112 | - |
| 1 | P113 | - |
| 2 | P101 | FLD |
| 2 | P112 | FLD |
| 2 | P113 | FLD |
| ... | ... | ... |

PLANE NUMBER MANAGEMENT TABLE

| PORT NUMBER :FMPT | ACTIVE PLANE NUMBER :FMNO |
|---|---|
| P101 | 0 |
| P112 | 1 |
| P113 | 1 |

MAC ADDRESS TABLE

| MAC ADDRESS :MMA | PLANE NUMBER :MFO | PORT NUMBER :MPT |
|---|---|---|
| M1 | 0 | P101 |
| M2 | 0 | P112 |
| M3 | 0 | P112 |
| M4 | 0 | P113 |

FLOODING INDICATION TABLE

| PLANE NUMBER :FFO | PORT NUMBER :FPT | FLOODING INDICATION :FIN |
|---|---|---|
| 0 | P101 | - |
| 0 | P112 | FLD |
| 0 | P113 | FLD |
| 1 | P101 | FLD |
| 1 | P112 | - |
| 1 | P113 | - |
| 2 | P101 | FLD |
| 2 | P112 | FLD |
| 2 | P113 | FLD |
| ... | ... | ... |

PLANE NUMBER
MANAGEMENT TABLE

| PORT NUMBER :FMPT | ACTIVE PLANE NUMBER :FMNO |
|---|---|
| P101 | 0 |
| P112 | 1 |
| P113 | 1 |

MAC ADDRESS TABLE

| MAC ADDRESS :MMA | PLANE NUMBER :MFO | PORT NUMBER :MPT |
|---|---|---|
| M1 | 0 | P101 |
| M2 | 0 | P112 |
| M3 | 0 | P112 |
| M4 | 1 | P112 |

FLOODING INDICATION TABLE

| PLANE NUMBER :FFO | PORT NUMBER :FPT | FLOODING INDICATION :FIN |
|---|---|---|
| 0 | P101 | - |
| 0 | P112 | FLD |
| 0 | P113 | FLD |
| 1 | P101 | FLD |
| 1 | P112 | - |
| 1 | P113 | - |
| 2 | P101 | FLD |
| 2 | P112 | FLD |
| 2 | P113 | FLD |
| ... | ... | ... |

| INPUT PORT NUMBER :VNP | VLAN NUMBER :VNO | TYPE:VTY | INTRA-DEVICE VLAN NUMBER :VSN |
|---|---|---|---|
| * | VID1 | * | V101 |
| * | VID2 | * | V102 |
| P101 | * | * | V103 |
| ⋮ | ⋮ | ⋮ | ⋮ |

| PORT NUMBER :FNPT | PLANE NUMBER :FNNO |
|---|---|
| P101 | 0 |
| P112 | 1 |
| P113 | 1 |
| ⋮ | ⋮ |

| INTRA-DEVICE VLAN NUMBER :MSN | MAC ADDRESS :MMA | PLANE NUMBER :MFO | PORT NUMBER :MPT |
|---|---|---|---|
| V103 | M1 | 0 | P101 |
| V101 | M2 | 0 | P112 |
| V101 | M3 | 0 | P112 |
| V101 | M4 | 0 | P113 |
| ⋮ | ⋮ | ⋮ | ⋮ |

| PLANE NUMBER :FFO | PORT NUMBER :FPT | FLOODING INDICATION :FIN |
|---|---|---|
| 0 | P101 | - |
| 0 | P112 | FLD |
| 0 | P113 | FLD |
| 1 | P101 | FLD |
| 1 | P112 | - |
| 1 | P113 | - |
| 2 | P101 | FLD |
| 2 | P112 | FLD |
| 2 | P113 | FLD |
| ⋮ | ⋮ | ⋮ |

| INTRA-DEVICE VLAN NUMBER :FASN | OUTPUT PORT NUMBER :FAPN |
|---|---|
| V103 | P101,P112,P113 |
| V101 | P112,P113 |
| ⋮ | ⋮ |

| INTRA-DEVICE VLAN NUMBER :FDSN | PORT NUMBER :FDPN | MAC ADDRESS :FDMA | LAYER 3 INFORMATION :FDH3 | LAYER 4 INFORMATION :FDH4 | FRAME OUTPUT DIRECTION :FDPO | DIRECT NOTIFICATION DESTINATION :FDNC |
|---|---|---|---|---|---|---|
| V103 | P101 | M1 | * | * | DISCARD | PROTOCOL CONTROLLER 311 |
| V101 | P112 | M2 | * | * | DISCARD | PROTOCOL CONTROLLER 311 |
| V101 | P112 | M3 | * | * | DISCARD | PROTOCOL CONTROLLER 311 |
| V101 | P113 | M4 | * | * | DISCARD | PROTOCOL CONTROLLER 312 |
| ... | ... | ... | ... | ... | ... | ... |

| INTRA-DEVICE VLAN NUMBER :FNSN | PLANE NUMBER :FNNO |
|---|---|
| V101 | 1 |
| V102 | 1 |
| V103 | 0 |
| ⋮ | ⋮ |

| PLANE NUMBER :FFO | INTRA-DEVICE VLAN NUMBER :FSN | FLOODING INDICATION :FIN |
|---|---|---|
| 0 | V101 | FLD |
| 0 | V102 | FLD |
| 0 | V103 | - |
| 1 | V101 | - |
| 1 | V102 | - |
| 1 | V103 | FLD |
| 2 | V101 | FLD |
| 2 | V102 | FLD |
| 2 | V103 | FLD |
| ⋮ | ⋮ | ⋮ |

| INTRA-DEVICE VLAN NUMBER :FMSN | ACTIVE PLANE NUMBER :FMNO |
|---|---|
| V101 | 1 |
| V102 | 1 |
| V103 | 0 |
| ⋮ | ⋮ |

Fig.26

| PORT NUMBER :FNPT | INTRA-DEVICE VLAN NUMBER :FNSN | PLANE NUMBER :FNNO |
|---|---|---|
| P101 | V103 | 0 |
| P112 | V101 | 1 |
| P113 | V101 | 1 |
| ⋮ | ⋮ | ⋮ |

| PLANE NUMBER :FFO | PORT NUMBER :FPT | INTRA-DEVICE VLAN NUMBER :FSN | FLOODING INDICATION :FIN |
|---|---|---|---|
| 0 | P101 | V103 | − |
| 0 | P112 | V101 | FLD |
| 0 | P113 | V101 | FLD |
| 1 | P101 | V103 | FLD |
| 1 | P112 | V101 | − |
| 1 | P113 | V101 | − |
| 2 | P101 | V103 | FLD |
| 2 | P112 | V101 | FLD |
| 2 | P113 | V101 | FLD |
| ⋮ | ⋮ | ⋮ | ⋮ |

| PORT NUMBER :FMPT | INTRA-DEVICE VLAN NUMBER :FMSN | ACTIVE PLANE NUMBER :FMNO |
|---|---|---|
| P101 | V103 | 0 |
| P112 | V101 | 1 |
| P113 | V101 | 1 |
| ⋮ | ⋮ | ⋮ |

100b

NETWORK RELAY APPARATUS

CROSS-REFERENCE TO RELATED APPLICATIONS

The present application claims the priority based on Japanese Patent Application No. 2009-158953 filed on Jul. 3, 2009, the disclosure of which is hereby incorporated by reference in its entirety.

BACKGROUND OF THE INVENTION

1. Field of the Invention

The present invention relates to a network relay apparatus used for relay in a network.

2. Description of the Related Art

On the occurrence of some failure on a route in a subnet, each network relay apparatus belonging to the subnet deletes learning information of a MAC address, which has been learned and stored in advance, to allow for a relearning operation of a detour route. Deletion of the pre-stored learning information of the MAC address, however, takes a relatively long time. A proposed technique utilizes MAC addresses stored in a learning table prior to the occurrence of a failure, with a view to shortening the time period for recovery from the failure.

This proposed technique of rewriting the learning information of the MAC address, however, still takes a relatively long time. This undesirably lowers the reliability of the network relay function (for example, the occurrence of communication cut-off or frame looping).

SUMMARY

By taking into account the issue discussed above, there is a requirement for providing a technique that shortens a time period for recovery from a failure and assures the high reliability.

According to first aspect of the present invention, a network relay apparatus is provided. The network relay apparatus includes: multiple ports, each being provided to send and receive a frame to and from each of multiple external devices; a MAC address storage configured to have registry of a transmit port selected among the multiple ports to be assigned to transmission of a frame to one of the multiple external devices, in correlation with a MAC address of the external device; a flooding indication storage configured to have registry of an information group or combination of information of correlating a key item to requirement or non-requirement of a flooding operation, wherein the key item is used for deletion of information of correlating the transmit port to the MAC address from the MAC address storage; a plane number management storage configured to have registry of identification information of identifying each information group, in correlation with the key item; a table manager configured to utilize the plane number management storage to specify current identification information being currently used and next identification information to be used next, with regard to a preset element of the key item for identifying a target of deletion of the information of correlating the transmit port to the MAC address from the MAC address storage, the table manager setting the requirement of the flooding operation in registry of a certain information group in the flooding indication storage having the preset element and being correlated to the current identification information, and the table manager setting the non-requirement of the flooding operation in registry of a certain information group in the flooding indication storage having the preset element and being correlated to the next identification information; and a frame processor configured to utilize the flooding indication storage to perform the flooding operation.

In the network relay apparatus according to this aspect of the invention, the table manager changes the registry of the requirement or the non-requirement of the flooding operation in the flooding indication storage, based on the preset element of the key item for identifying the target of deletion of the information of correlating the transmit port to the MAC address from the MAC address storage and on the identification information of identifying each information group or combination of information stored in the flooding indication storage. The frame processor utilizes the flooding indication storage to perform the flooding operation. The flooding operation with regard to a registry of information identified as the target of information deletion in the MAC address storage can thus be performed at the earlier stage to eliminate the communication cut-off state. This arrangement effectively shortens the time period for recovery from a failure and assures the high reliability of the network relay apparatus.

According to the first aspect of the present invention, the network relay apparatus may further includes: a learning manager configured to perform a learning process with regard to the MAC address storage, wherein in response to reception of a frame from a certain external device, the frame processor utilizes the plane number management storage to retrieve identification information correlated to a frame-receiving port that receives the frame, the frame processor searches the MAC address storage for any registry of information matching with a combination of a MAC address of the certain external device, the frame-receiving port, and the identification information correlated to the frame-receiving port, the learning manager receives a result of the search by the frame processor, when the received result of the search represents no matching registry of information and the MAC address storage has no registry of the MAC address of the certain external device, the learning manager newly registers the combination of the MAC address of the certain external device, the frame-receiving port, and the identification information correlated to the frame-receiving port, into the MAC address storage, and when the received result of the search represents no matching registry of information and the MAC address storage has registry of the MAC address of the certain external device, the learning manager updates the MAC address storage with a combination of the frame-receiving port and the identification information correlated to the frame-receiving port, in correlation with the registry of the MAC address of the certain external device.

In the network relay apparatus of this application, in response to reception of a frame from one of the multiple external devices, information on the received frame is newly registered into the MAC address storage, or the registry in the MAC address storage is updated with the information on the received frame. This arrangement enables the registry in the MAC address storage to be updated with the information of the received frame, thereby eliminating the flooding state at the earlier timing and reducing the network traffic. This result in shortening the time period for recovery from a failure and assuring the high reliability of the network relay apparatus.

According to the first aspect of the present invention, the network relay apparatus may further includes: multiple protocol controllers configured to perform controls corresponding to types of communication protocols; and a protocol manager configured to manage the multiple protocol controllers, wherein each of the multiple protocol controllers notifies the table manager of a key item, which is set in advance independently of settings in other protocol controllers, the table manager utilizes the plane number management storage to specify current identification information being currently used and next identification information to be used next, with regard to a preset element of the notified key item for identifying a target of deletion of the information of correlating the transmit port to the MAC address from the MAC address storage, and the frame processor performing the flooding operation by causing the table manager to set the requirement of the flooding operation in registry of a certain information group in the flooding indication storage having the preset element and being correlated to the current identification information and to set the non-requirement of the flooding operation in registry of a certain information group in the flooding indication storage having the preset element and being correlated to the next identification information.

This arrangement is preferably applied to the network relay apparatus capable of controlling multiple different protocols and assures the similar effects to those described above without changing the behaviors of the table manager.

According to the first aspect of the present invention, the network relay apparatus may further includes: a control frame information storage configured to have registry of output direction information, which includes at least one of information representing requirement or non-requirement of discarding a control frame received from one of the external devices and information representing a forwarding destination within the network relay apparatus, and registry of direct notification information, which includes at least one of information representing requirement or non-requirement for direct notification of the received control frame to a designated protocol controller selected among the multiple protocol controllers and information representing a notification destination within the network relay apparatus; and a protocol control frame detector configured to specify the output direction information based on header information included in the received control frame and the registries in the control frame information storage and to induce an operation of discarding the control frame or a forwarding operation of forwarding the control frame to the protocol manager, the protocol control frame detector specifying the direct notification information based on the header information included in the received control frame and the registries in the control frame information storage, identifying implementation or non-implementation of direct notification of information of the control frame to a designated protocol controller selected among the multiple protocol controllers, and upon identification of the implementation of direct notification, notifies the designated protocol controller of the information of the control frame.

This arrangement allows for the flexible processing corresponding to the characteristics of the communication protocols handled by the respective protocol controllers.

According to the first aspect of the present invention, the network relay apparatus, wherein the key item is selected among the group consisting of a port number, a VLAN number, a link aggregation group number, and combinations of two or more of the port number, the VLAN number, and the link aggregation group number.

This arrangement enables the key item to be set adequately according to the characteristics of the communication protocol implemented on the network relay apparatus.

The technique of the invention is not restricted to the network relay apparatus having any of the configurations discussed above, but may be actualized by diversity of other applications, for example, a control method of such a network relay apparatus, a network relay system, computer programs executed to implement the functions of the apparatus or the system or the functional steps of the method, and recording media in which such computer programs are recorded.

BRIEF DESCRIPTION OF THE DRAWINGS

FIGS. 2A-2C are explanatory diagrammatic representations of the contents of tables stored in the switch #1 in the state before the occurrence of a failure (FIG. 1A);

FIGS. 3A-3C are explanatory diagrammatic representations of the contents of the respective tables stored in the switch #1 in the state that a clear instruction of learning information of the MAC address is given after the occurrence of a failure;

FIGS. 4A-4C are explanatory diagrammatic representations of the contents of the respective tables stored in the switch #1 in the state after the state of FIGS. 3A-3C;

FIGS. 5A-5C are explanatory diagrammatic representations of the contents of the respective tables stored in the switch #1 in the state after the state of FIGS. 4A-4C;

FIG. 10 is an explanatory diagrammatic representation of one example of the VLAN specification table;

FIG. 11 is an explanatory diagrammatic representation of one example of the plane number table;

FIG. 12 is an explanatory diagrammatic representation of one example of the MAC address table;

FIG. 13 is an explanatory diagrammatic representation of one example of the flooding indication table;

FIG. 14 is an explanatory diagrammatic representation of one example of the flooding target table;

FIG. 16 is an explanatory diagrammatic representation of one example of the control frame identification table;

FIG. 22 is an explanatory diagrammatic representation of one example of the plane number table in the second embodiment;

FIG. 23 is an explanatory diagrammatic representation of one example of the flooding indication table in the second embodiment;

FIG. 24 is an explanatory diagrammatic representation of one example of the plane number management table in the second embodiment;

FIG. 26 is an explanatory diagrammatic representation of one example of the plane number table in the third embodiment;

FIG. 27 is an explanatory diagrammatic representation of one example of the flooding indication table in the third embodiment; and FIG. 28 is an explanatory diagrammatic representation of one example of the plane number management table in the third embodiment.

DESCRIPTION OF THE PREFERRED EMBODIMENT

Figure 1A:
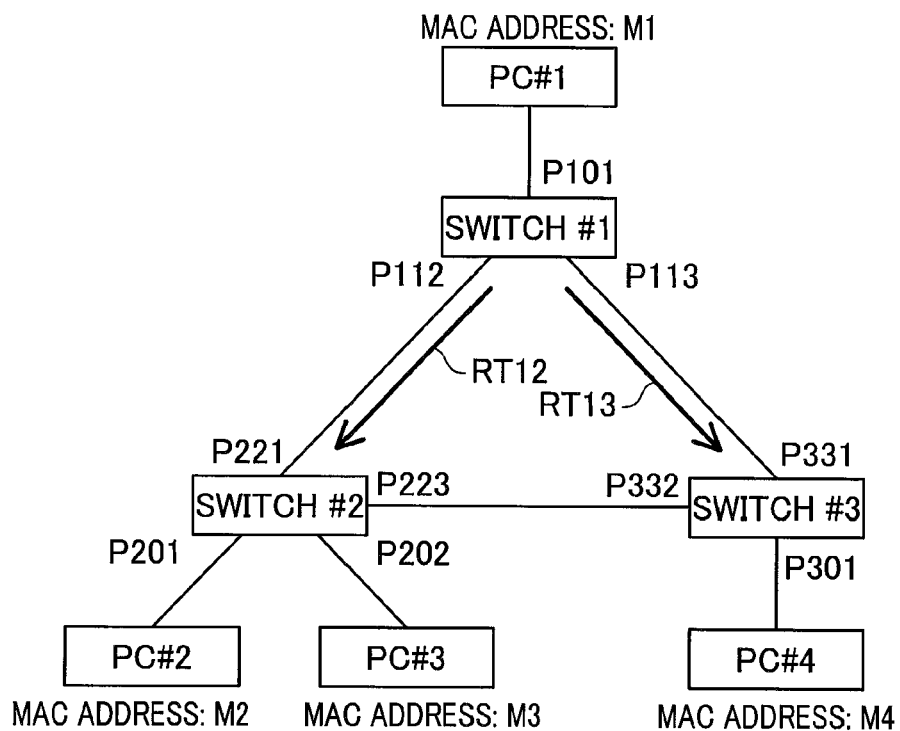
FIGS. 1A and 1B are explanatory diagrammatic representations of a general network configuration including network relay devices according to one embodiment of the invention.
Figure 1B:
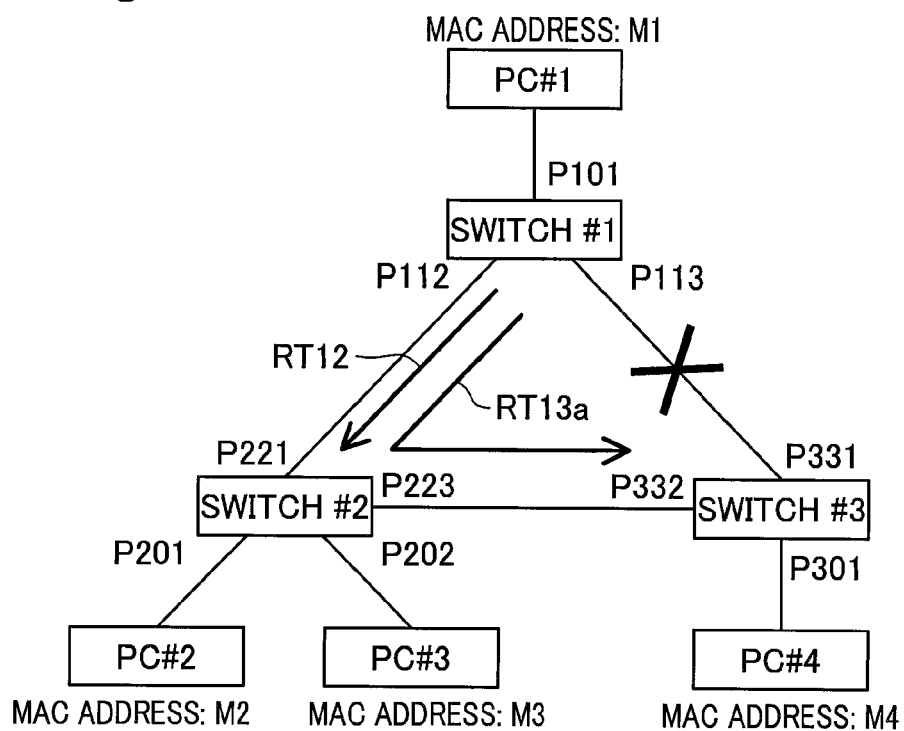

Next, aspects of the present invention will be described in the following order on the basis of embodiments:
A. First Embodiment
(A-1) General Concept FIGS. 1A and 1B are explanatory diagrammatic representations of a general network configuration including network relay devices according to one embodiment of the invention. The network relay device of this embodiment is equivalent to the network relay apparatus of the invention. FIG. 1A shows an example of network routes before the occurrence of a failure. The network configuration includes three network relay devices #1 through #3 (hereafter may be referred to as 'switches') and four external devices #1 through #4 (hereafter may be referred to as 'PCs'). These switches #1 through #3 are LAN switches having the bridge function and the router function. Although PCs (Personal Computers) are used as the external devices #1 through #4 in this embodiment, the external devices are not restricted to the PCs but may be any arbitrary devices, such as home electric appliances having the network connecting function.

The switches #1 and #2 are interconnected by means of respective ports P112 and P221. Similarly the switches #2 and #3 are interconnected by means of respective ports P223 and P332, and the switches #3 and #1 are interconnected by means of respective ports P331 and P113. Such connections form a ring network of the three switches #1 through #3. The PC #1 is connected to a port P101 of the switch #1. Similarly the PC #2 is connected to a port P201 of the switch #2, the PC #3 is connected to a port P202 of the switch #2, and the PC #4 is connected to a port P301 of the switch #3. The PCs #1 through #4 have mutually different MAC addresses M1 through M4.

In the illustrated example of FIG. 1A with no failure in the network routes, a frame to be sent from the PC #1 to the PC #2 is relayed across a route RT12. A frame to be sent from the PC #1 to the PC #4 is relayed across a router RT13. The switch #1 receiving a frame from the PC #1 searches a MAC address table stored in the switch #1 for a transmit port correlated to a MAC address of a destination external device to determine the route for the frame relay.

FIG. 1B shows an example of network routes after the occurrence of a failure. In the illustrated example of FIG. 1B with a failure occurring in the network route between the switch #1 and the switch #3, a frame to be sent from the PC #1 to the PC #2 is relayed across the route RT12 in the same manner as the state with no failure. A frame to be sent from the PC #1 to the PC #4 is, however, relayed across a detour route RT13a, since there is the failure occurring in the network route between the switches #1 and #3. Series of operations of the switch #1 before and after the occurrence of a failure shown in the examples of FIGS. 1A and 1B are described below with reference to some important tables. The switches #2 and #3 perform similar series of operations to those of the switch #1 and are thus not specifically explained.

FIGS. 2A-2C are explanatory diagrammatic representations of the contents of tables stored in the switch #1 in the state before the occurrence of a failure (FIG. 1A). FIG. 2A shows one example of a plane number management table 100. The plane number management table 100 stores currently active plane numbers in correlation with port numbers. The plane number represents identification information used to identify each combination of information (each information group) in a flooding indication table of FIG. 2C explained later. The plane number management table 100 has a port number field FMPT and an active plane number field FMNO. The port number field FMPT has registries of identification codes or port numbers P101, P112, and P113 allocated to the respective ports included in the switch #1. The active plane number field FMNO has registries of currently active plane numbers (equal to an initial value '0' in this state) with regard to the respective ports having the port numbers registered in the port number field FMPT. The plane number will be described later in detail. For the simplicity of explanation, only the plane number management table 100 is mentioned here as the table for managing the currently active plane numbers. Two tables having the same structure, a plane number table 560 and the plane number management table 100, are referred to in the subsequent description of the embodiment. One of these tables may be omitted or one common table may be used instead, in the implementation of this embodiment described later.

FIG. 2B shows one example of a MAC address table 570. The MAC address table 570 stores MAC addresses of PCs as potential destinations in correlation with transmit ports of the respective switches. The MAC address table 570 has a MAC address field MMA, a plane number field MFO, and a port number field MPT. The MAC address field MMA has registries of the MAC addresses M1, M2, M3, and M4 of the respective PCs that belong to an identical subnet and may be designated as a destination. The plane number field MFO has registries of plane numbers (equal to an initial value '0' in this state) with regard to respective ports having port numbers registered in the port number field MPT. The port number field MPT has registries of port numbers P101, P112, P112, and P113 allocated to the transmit ports used for frame transmission to the respective PCs having the MAC addresses registered in the MAC address field MMA.

FIG. 2C shows one example of a flooding indication table 580. The flooding indication table 580 stores information groups or combinations of information. The 'combination of information' means a combination of multiple pieces of information representing the requirement or the non-requirement of flooding individually determined with regard to port numbers of all the ports included in the switch #1. Each of EG1 through EG3 in the flooding indication table 580 of FIG. 2C represents a combination of information. In the description hereafter, the combinations of information EG1 through EG3 are also referred to as 'information groups'. This illustrated example has three combinations of information. This number is, however, only illustrative and not restrictive, and there may be any arbitrary number of combinations of information.

The flooding indication table 580 has a plane number field FFO, a port number field FPT, and a flooding indication field FIN. The plane number field FFO has registries of plane numbers. In the illustrated example of FIG. 2C, a plane number '0' is registered as an identification number of the combination of information EG1. Similarly a plane number '1' and a plane number '2' are respectively registered as an identification number of the combination of information EG2 and as an identification number of the combination of information EG3. The port number field FPT has registries of the identification codes or port numbers P101, P112, and P113 allocated to the respective ports included in the switch #1 with regard to each plane number. The flooding indication field FIN has registries of identification symbols representing a requirement of flooding and a non-requirement of flooding. The flooding indication table 580 of FIG. 2C shows the state before the occurrence of a failure. An identification symbol '-' representing the non-requirement of flooding is set in the flooding indication field FIN corresponding to an initial value '0' in the plane number field FFO. An indication symbol 'FLD' representing the requirement of flooding is set in the flooding indication field FIN corresponding to a non-zero value in the plane number field FFO.

The following gives a processing procedure performed by the switch #1 for relay of a frame from the PC #1 to the PC #4 in the state before the occurrence of a failure (in the case of selection of the route RT13 in FIG. 1A):

Step 01) The switch #1 receives a frame addressed to the PC #4 from the PC #1 and retrieves a registry (=0) in the active plane number field FMNO corresponding to the frame-receiving port (P101) from the plane number management table 100.

Step 02) The switch #1 refers to the registries in the MAC address table 570, header information of the received frame, information on the frame-receiving port, and the active plane number retrieved at step 01 and identifies the requirement or the non-requirement for a learning process with regard to the MAC address table 570. There is an existing entry E01 with the MAC address M1, the plane number 0, and the receiving port P101 in the MAC address table 570, so that the learning process is not required.

Step 03) The switch #1 refers to the header information of the received frame and searches the MAC address table 570 for any entry with the MAC address of the destination PC (PC #4).

Step 04) There is an existing entry E02 with the MAC address of the PC #4 in the MAC address table 570. The switch #1 retrieves a registry in the flooding indication field FIN corresponding to the combination of the plane number (0) and the port number (P113) included in the existing entry E02 from the flooding indication table 580.

Step 05) The retrieved registry in the flooding indication field FIN corresponding to the combination of the plane number (0) and the port number (P113) is the indication symbol '-' representing the non-requirement of flooding. The switch #1 accordingly sends the frame addressed to the PC #4 via an output port having the port number (P113) obtained at step 04.

FIGS. 3A-3C are explanatory diagrammatic representations of the contents of the respective tables stored in the switch #1 in the state that a clear instruction of learning information of the MAC address is given after the occurrence of a failure. FIGS. 3A through 3C show examples of the respective tables corresponding to those of FIGS. 2A through 2C. In the ring network as shown in FIG. 1, a failure on a route is detectable with a control frame called a health check frame. A concrete procedure of failure detection selects and designates one switch as a master node among the switches #1 through #3 forming the ring network and causes the mater node to send a health check frame. The normality of the network is detected, when the health check frame sent from the master node goes around the ring network and is returned to the master node. The occurrence of a failure somewhere on the route of the ring network is detected, on the other hand, when the health check frame is not returned to the master node. In response to detection of the occurrence of a failure somewhere on the route of the ring network, the master node makes a flash control frame for clearing the learning information of the MAC address go around the ring network. The following procedure is on the assumption that the switch #1 functioning as a transit node (where the remaining switches other than the switch designated as the master node are transit nodes) receives the flash control frame. When the switch #1 is designated as the master node, the switch #1 performs the following procedure when sending the flash control frame.

Step 11) The switch #1 refers to the flash control frame to be notified of deletion of the information regarding the ports P112 and P113 from the MAC address table 570.

Step 12) The switch #1 retrieves registries in the active plane number field FMNO corresponding to the port P112 and the port P113 from the plane number management table 100. The switch #1 determines a new active plane number (for example, 1) by taking into account the retrieved currently active plane number (0).

Step 13) The switch #1 retrieves entries E11 and E12 with the port number P112 and the port number P113 and the currently active plane number (0) from the flooding indication table 580 and changes the registries in the flooding indication field FIN of the retrieved entries E11 and E12 from the indication symbol '-' representing the non-requirement of flooding to the indication symbol 'FLD' representing the requirement of flooding. The switch #1 also retrieves entries E13 and E14 with the port number P112 and the port number P113 and the new active plane number (1) from the flooding indication table 580 and changes the registries in the flooding indication field FIN of the retrieved entries E13 and E14 from the indication symbol 'FLD' representing the requirement of flooding to the indication symbol '-' representing the non-requirement of flooding.

FIGS. 4A-4C are explanatory diagrammatic representations of the contents of the respective tables stored in the switch #1 in the state after the state of FIGS. 3A-3C. FIGS. 4A through 4C show examples of the respective tables corresponding to those of FIGS. 2A through 2C.

Step 14) The switch #1 retrieves entries E21 and E22 with the port number P112 and the port number P113 from the plane number management table 100 and changes the registries in the active plane number field FMNO of the retrieved entries E21 and E22 to the new active plane number (1).

Step 15) The switch #1 receives a frame addressed to the PC #4 from the PC #1 and retrieves a registry (=0) in the active plane number field FMNO corresponding to the frame-receiving port (P101) from the plane number management table 100 in the same manner as step 01 explained above.

Step 16) The switch #1 identifies the requirement or the non-requirement for a learning process in the same manner as step 02 explained above. There is an existing entry E31 with the MAC address M1, the plane number 0, and the receiving port P101 in the MAC address table 570, so that the learning process is not required.

Step 17) The switch #1 refers to the header information of the received frame and searches the MAC address table 570 for any entry with the MAC address of the destination PC #4 in the same manner as step 03 explained above.

Step 18) There is an existing entry E32 with the MAC address of the PC #4 in the MAC address table 570. The switch #1 retrieves a registry in the flooding indication field FIN corresponding to the combination of the plane number (0) and the port number (P113) included in the existing entry E32 from the flooding indication table 580 in the same manner as step 04 explained above.

Step 19) The retrieved registry in the flooding indication field FIN corresponding to the combination of the plane number (0) and the port number (P113) is the indication symbol 'FLD' representing the requirement of flooding (E41). The switch #1 accordingly performs a flooding operation.

FIGS. 5A-5C are explanatory diagrammatic representations of the contents of the respective tables stored in the switch #1 in the state after the state of FIGS. 4A-4C. FIGS. 5A through 5C show examples of the respective tables corresponding to those of FIGS. 2A through 2C.

Step 20) The switch #1 receives a reply frame (a frame addressed to the PC #1 from the PC #4) in response to the operation at step 19 and retrieves a registry (=1) in the active plane number field FMNO corresponding to the frame-receiving port (P112) from the plane number management table 100 in the same manner as step 01 explained above.

Step 21) The switch #1 identifies the requirement or the non-requirement for a learning process in the same manner as step 02 explained above. There is no entry with the MAC address M4, the plane number 1, and the receiving port P112 (FIG. 4B). The entry E32 is then updated to an entry E52 (FIG. 5B).

Step 22) The switch #1 refers to the header information of the received frame and searches the MAC address table 570 for any entry with the MAC address of the destination PC #1 in the same manner as step 03 explained above.

Step 23) There is an existing entry E51 with the MAC address of the PC #1 in the MAC address table 570. The switch #1 retrieves a registry in the flooding indication field FIN corresponding to the combination of the plane number (0) and the port number (P101) included in the existing entry E51 from the flooding indication table 580 in the same manner as step 04 explained above.

Step 24) The retrieved registry in the flooding indication field FIN corresponding to the combination of the plane number (0) and the port number (P101) is the indication symbol '-' representing the non-requirement of flooding (E61). The switch #1 accordingly does not perform a flooding operation.

In the case where a frame addressed to the PC #1 is received from the PC #3 as a reply frame to the operation at step 19, the switch #1 retrieves a registry (=1) in the active plane number field FMNO corresponding to the frame-receiving port (P112) at step 20 and identifies the requirement or the non-requirement for a learning process at step 21. In this case, there is no entry with the MAC address M3, the plane number 1, and the receiving port P112. The plane number of an existing entry (with the MAC address M3, the plane number 0, and the receiving port P112) is accordingly updated from 0 to 1. The similar series of processing is performed in the case where a frame addressed to the PC #1 is received from the PC #2.

The switch #1 refers to the registries in the flooding indication table 580 and identifies the requirement or the non-requirement of flooding. This allows for the flooding operation at the earlier stage, compared with the known procedure of deleting entries from a MAC address table having a large information volume. The combinations of information or the information groups are provided in advance in the flooding indication table 580. The plane number registered in the MAC address table 570 as the identification information for identifying each information group is used to determine which of the information groups registered in the flooding indication table 580 should be referred to and to specify the requirement or non-requirement of flooding. The plane numbers registered in the MAC address table 570 can thus be regarded as the tool of generation management of the learning process performed for the MAC address table 570.

(A-2) System Configuration

Figure 6:
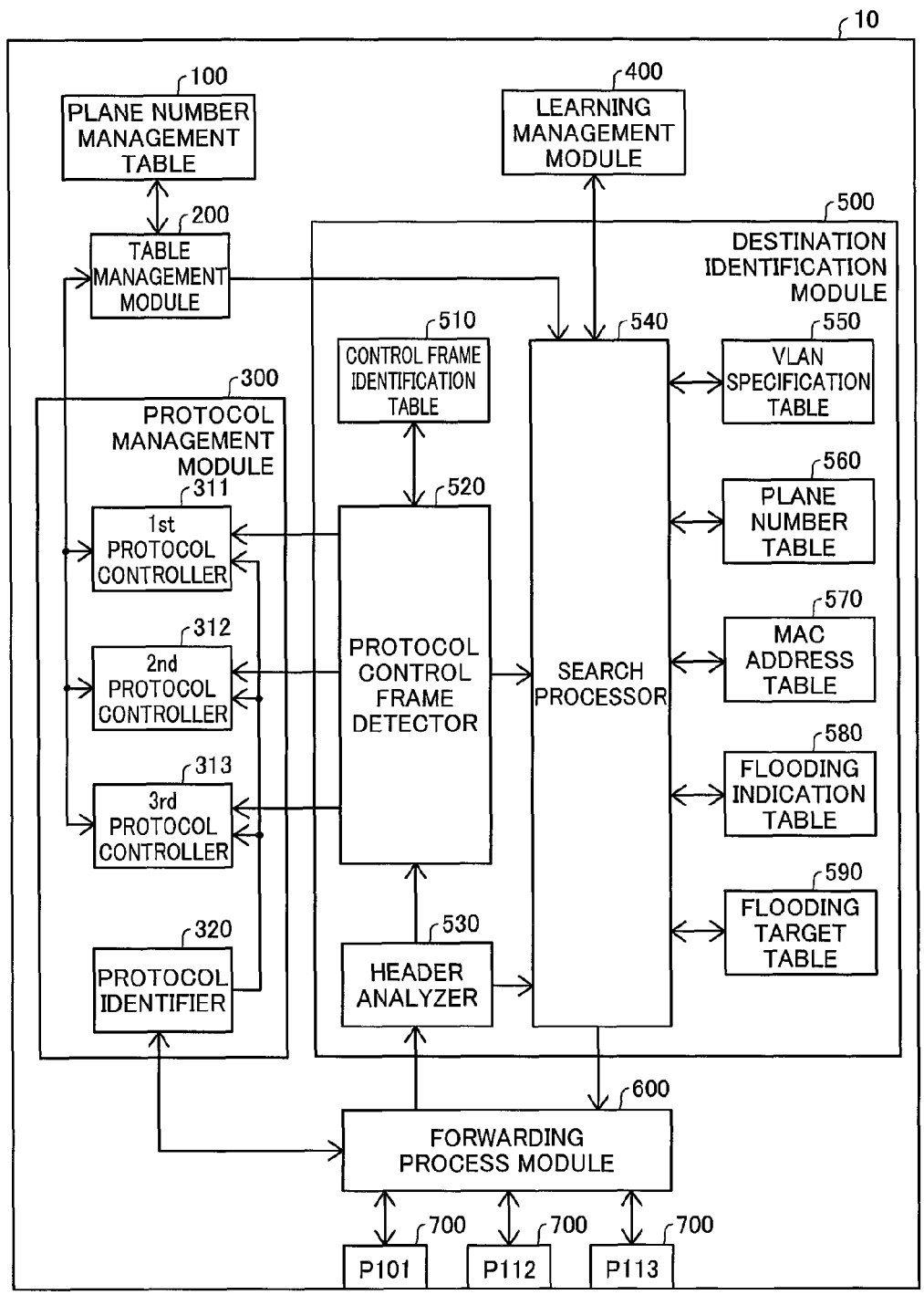
FIG. 6 is an explanatory diagrammatic representation of the general structure of a switch according to the embodiment of the invention.

FIG. 6 is an explanatory diagrammatic representation of the general structure of a switch 10 according to the embodiment of the invention. The switch 10 is equivalent to any of the switches #1 through #3 shown in FIG. 1 and has a plane number management table 100, a table management module 200, a protocol management module 300, a learning management module 400, a destination identification module 500, a forwarding process module 600, and ports 700. The plane number management table 100 of the embodiment is equivalent to the plane number management storage in the claims of the invention and is used to specify the currently active plane number as described above. The table management module 200 of the embodiment is equivalent to the table manager in the claims of the invention and has the function of managing the plane number management table 100, as well as a plane number table 560 and a flooding indication table 580 (described later).

The protocol management module 300 has a first protocol controller 311, a second protocol controller 312, a third protocol controller 313, and a protocol identifier 320. The protocol management module 300 of the embodiment is equivalent to the multiple protocol controllers and the protocol manager in the claims of the invention. The protocol management module 300 has the function of managing these multiple protocol controllers 311 through 313. The number of protocol controllers included in the protocol management module 300 is not restricted to three but may be any arbitrary number. The protocol controllers 311 through 313 perform controls corresponding to various types of communication protocols implemented on the switch 10. Typical examples of the communication protocols include STP (Spanning Tree Protocol), MSTP (Multiple Spanning Tree Protocol), PVSTP (Per Virtual LAN Spanning Tree Protocol), and GSRP (Gigabit Switch Redundancy Protocol), in addition to the ring protocol explained above with reference to FIG. 1. The protocol identifier 320 refers to header information of a received control frame and selects an adequate protocol controller assigned to process the received control frame among the protocol controllers 311 through 313.

The learning management module 400 of the embodiment is equivalent to the learning manager in the claims of the invention and has the function of managing a learning process performed in the switch 10.

The destination identification module 500 has the function of performing a destination search process of each frame received by the switch 10. The destination identification module 500 has a control frame identification table 510, a protocol control frame detector 520, a header analyzer 530, a search processor 540, a VLAN specification table 550, a plane number table 560, a MAC address table 570, a flooding indication table 580, and a flooding target table 590. The control frame identification table 510 of the embodiment is equivalent to the control frame information storage in the claims of the invention and is used to specify output direction information and direct notification information. The protocol control frame detector 520 of the embodiment is equivalent to the protocol control frame detector in the claims of the invention and refers to the control frame identification table 510 to control, for example, a forwarding operation of a control frame received by the switch 10. The header analyzer 530 analyzes header information of each received frame.

The VLAN specification table 550 is used to specify an intra-device VLAN number used only within the switch 10 corresponding to the port number of a frame-receiving port.

The VLAN specification table 550 may be omitted according to the requirements. The plane number table 560 of the embodiment is equivalent to the plane number management storage in the claims of the invention and is used to specify the currently active plane number like the plane number management table 100 described above. The MAC address table 570 of the embodiment is equivalent to the MAC address storage in the claims of the invention and is used for a learning process and a destination search process described later. The flooding indication table 580 of the embodiment is equivalent to the flooding indication storage in the claims of the invention and is used to identify the requirement or the non-requirement of flooding as described above. The flooding target table 590 has registries of flooding targets. The search processor 540 searches the respective tables with information of each received frame and determines the destination of the received frame (destination search process).

The forwarding process module 600 has the function of sending and receiving frames to and from external devices via the ports 700 and the function of forwarding frames to various components in the switch 10. The ports 700 work as interfaces of frame transmission and reception between the switch 10 and external devices connecting with the switch 10. The switch 10 of this embodiment has three ports 700 with identification codes or port numbers of P101, P112, and P113. The number of ports and their identification codes are not restricted to this example but may be determined arbitrarily.

Figure 7:
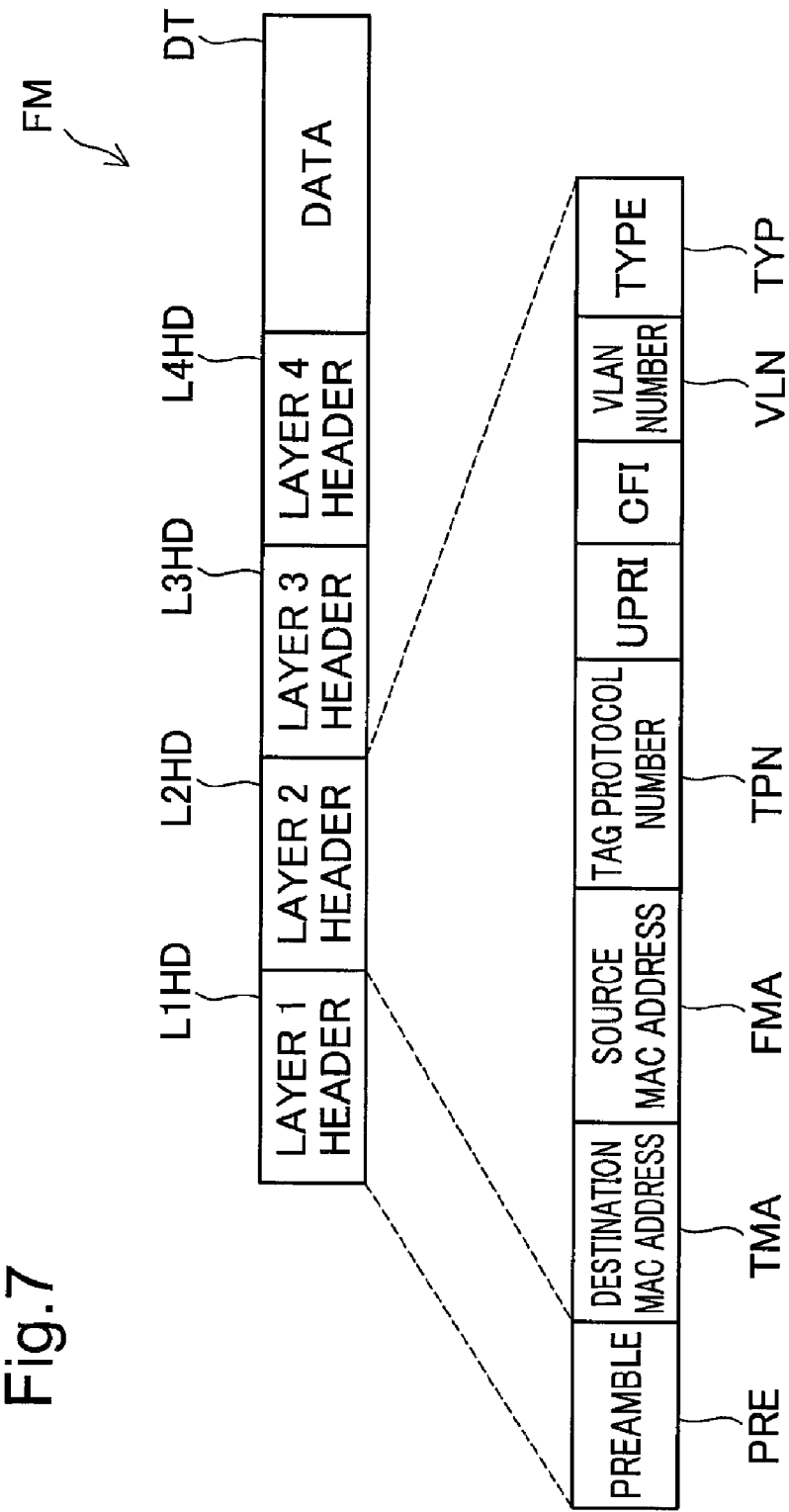
FIG. 7 is an explanatory diagrammatic representation of the structure of a frame FM handled by the switch.

FIG. 7 is an explanatory diagrammatic representation of the structure of a frame FM handled by the switch 10. The frame FM includes a layer 1 header L1HD, a layer 2 header L2HD, a layer 3 header L3HD, a layer 4 header L4HD, and data DT. The layer 1 header L1HD includes a preamble PRE. The layer 2 header L2HD includes a destination MAC address TMA, a source MAC address FMA, a TAG protocol number TPN, UPRI, CFI, a VLAN number VLN, and a type TYP. A MAC address of an external device as a destination of the frame FM is stored in the destination MAC address TMA of the layer 2 header L2HD. A MAC address of an external device as a source or sender of the frame FM is stored in the source MAC address FMA. The TAG protocol number TPN, the UPRI, the CFI, and the VLAN number VLN may be omitted according to the requirements.

(A-3) Frame Forwarding Process

Figure 8:
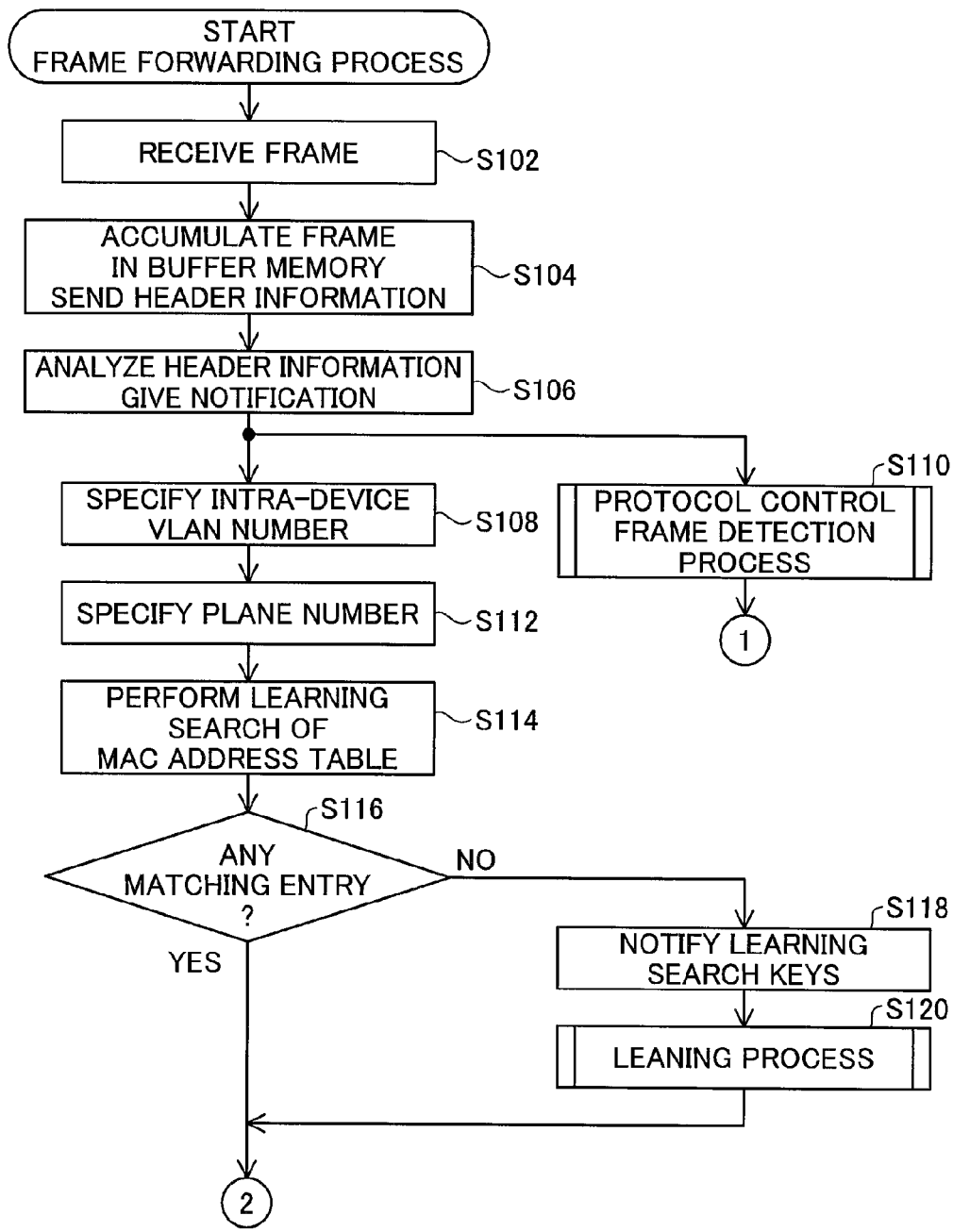
FIG. 8 is a flowchart showing a procedure of frame forwarding process.
Figure 9:
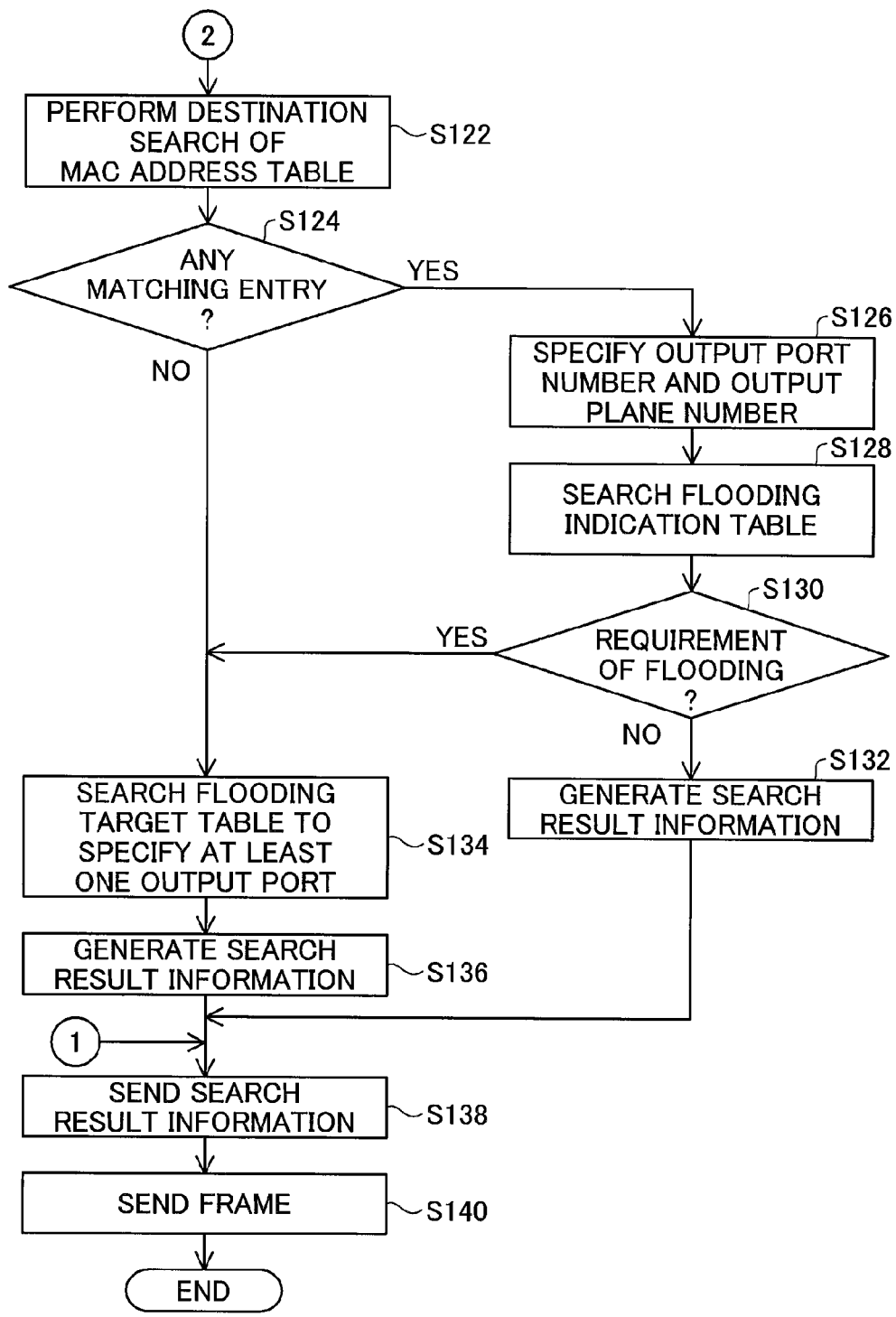
FIG. 9 is a flowchart showing a procedure of frame forwarding process.

FIGS. 8 and 9 are flowcharts showing a procedure of frame forwarding process. The forwarding process module 600 receives a frame FM via the port 700 at step S102 and accumulates the received frame FM into a buffer memory (not shown) within the forwarding process module 600 at step S104. At step S104, the forwarding process module 600 concurrently sends header information of the layer 2 header L2HD, the layer 3 header L3HD, and the layer 4 header L4HD included in the received frame FM and information on the port receiving the frame FM to the search processor 540. At subsequent step S106, the header analyzer 530 analyzes the received header information and extracts required information. The required information to be extracted includes the destination MAC address TMA, the source MAC address FMA, the VLAN number VLN, and the type TPY of the layer 2 header L2HD. The header analyzer 530 subsequently notifies the search processor 540 and the protocol control frame detector 520 of the extracted information and the port number of the port receiving the frame FM at step S106. The protocol control frame detector 520 receiving the notification performs a protocol control frame detection process at step S110. The details of the protocol control frame detection process will be described later.

FIG. 10 is an explanatory diagrammatic representation of one example of the VLAN specification table 550. The VLAN specification table 550 is used to specify an intra-device VLAN number used only within the switch 10 corresponding to the frame-receiving port number. The VLAN specification table 550 has an input port number field VNP, a VLAN number field VNO, a type field VTY, and an intra-device VLAN number field VSN. The input port number field VNP has registries of port numbers of ports receiving respective frames as frame identification information. The VLAN number field VNO has registries of identification codes of belonging VLANs as the frame identification information. The type field VTY has registries of information to be registered in the type field TYP of the frame FM (FIG. 7) (information specifying an upper-layer protocol) as the frame identification information. The intra-device VLAN number field VSN has registries of identification codes of intra-device VLANs individually specified for the respective received frames. These conditional fields are only illustrative and not restrictive, and the VLAN specification table may be constructed to include any other suitable fields. For example, other pieces of information included in the frame FM may be added as conditional fields in the VLAN specification table. A symbol '*' registered in various conditional fields (input port number field VNP, VLAN number field VNO, and type field VTY) represents that any condition is acceptable.

Referring back to the flowchart of FIG. 8, the search processor 540 notified of the header information specifies an intra-device VLAN number at step S108. More specifically, the search processor 540 searches the VLAN specification table 550 (FIG. 10) for any matching entry with the port number of the port receiving the frame FM and the VLAN number VLN and the type TYP included in the header information of the received frame FM as keys and designates the registry in the intra-device VLAN number field VSN of the matching entry as the intra-device VLAN number.

FIG. 11 is an explanatory diagrammatic representation of one example of the plane number table 560. The plane number table 560 is used to specify the currently active plane number like the plane number management table 100 described above. The plane number table 560 has a port number field FNPT and a plane number field FNNO. The port number field FNPT has registries of identification codes of the respective ports included in the switch 10. The port number field FNPT is used as a key item for deleting information of correlating the transmit port to the MAC address from the MAC address table 570 as described later. The plane number field FNNO has registries of currently active plane numbers with regard to the respective ports registered in the port number field FNPT.

Referring back to the flowchart of FIG. 8, the search processor 540 specifies a plane number at step S112. More specifically, the search processor 540 searches the plane number table 560 (FIG. 11) for any matching entry with the port number of the port receiving the frame FM as a key and designates the registry in the plane number field FNNO of the matching entry as the plane number. This plane number is correlated to the frame-receiving port on the plane number management storage in the claims of the invention.

FIG. 12 is an explanatory diagrammatic representation of one example of the MAC address table 570. The MAC address table 570 is used for the learning process and the destination search process. The MAC address table 570 has an intra-device VLAN number field MSN, in addition to the three fields, the MAC address field MMA, the plane number field MFO, and the port number field MPT, described above with reference to FIG. 2B. The intra-device VLAN number field MSN has registries of intra-device VLAN numbers specified corresponding to the port numbers of ports receiving respective frames and the header information of the respective received frames.

Referring back to the flowchart of FIG. 8, the search processor 540 performs a learning search of the MAC address table 570 at step S114. More specifically, the search processor 540 searches the MAC address table 570 (FIG. 12) for any matching entry with a combination of learning search keys. The combination of learning search keys includes the port number of the port receiving the frame FM, the intra-device VLAN number specified at step S108, the source MAC address FMA included in the layer 2 header L2HD, and the plane number specified at step S112. When there is no matching entry (step S116: No), the search processor 540 notifies the learning management module 400 of the combination of learning search keys at step S118. At subsequent step S120, the learning management module 400 performs a learning process. The details of the learning process will be described later. When there is any matching entry (step S116: Yes), on the other hand, the processing flow proceeds to step S122 in the flowchart of FIG. 9.

At step S122, the search processor 540 performs a destination search of the MAC address table 570. More specifically, the search processor 540 searches the MAC address table 570 (FIG. 12) for any matching entry with the destination MAC address TMA included in the layer 2 header L2HD and the intra-device VLAN number specified at step S108 (FIG. 8) as keys. When there is no matching entry (step S124: No), the processing flow proceeds to step S134. When there is any matching entry (step S124: Yes), the search processor 540 specifies the registries in the plane number field MFO and the port number field MPT of the matching entry as an output plane number and as an output port number at step S126.

FIG. 13 is an explanatory diagrammatic representation of one example of the flooding indication table 580. The flooding indication table 580 stores information groups or combinations of information of correlating the port number used as a key to the requirement or the non-requirement of flooding. The details of the flooding indication table 580 are described previously with reference to FIG. 2C.

Referring back to the flowchart of FIG. 9, the search processor 540 searches the flooding indication table 580 (FIG. 13) at step S128. More specifically, the search processor 540 searches the flooding indication table 580 for any matching entry with the output port number and the output plane number specified at step S126 as keys and obtains the registry in the flooding indication field FIN of the matching entry.

FIG. 14 is an explanatory diagrammatic representation of one example of the flooding target table 590. The flooding target table 590 is used to specify a port number as an output direction of a flooding frame. The flooding target table 590 has an intra-device VLAN number field FASN and an output port number field FAPN. The intra-device VLAN number field FASN has registries of intra-device VLAN numbers specified corresponding to the port numbers of ports receiving respective frames and the header information of the respective received frames. The output port number field FAPN has registries of port numbers as output directions of flooding frames.

Referring back to the flowchart of FIG. 9, the search processor 540 identifies the requirement or the non-requirement of flooding at step S130. When there is the non-requirement for flooding represented by the indication symbol '-' in the flooding indication field FIN (step S130: No), at subsequent step S132, the search processor 540 generates search result information indicating the output port number specified at step S126. When there is the requirement for flooding represented by the indication symbol 'FLD' in the flooding indication field FIN (step S130: Yes) or when there is no matching entry as the result of the destination search (step S124: No), the search processor 540 specifies at least one output port at step S134. More specifically, the search processor 540 searches the flooding target table 590 (FIG. 14) for any matching entry with the intra-device VLAN number specified at step S108 (FIG. 8) as a key and designates the registry in the output port number field FAPN of the matching entry as the at least one output port. At subsequent step S136, the search processor 540 functioning as the frame processor generates search result information indicating all the port numbers of the at least one output port specified at step S134 with exclusion of the frame-receiving port number, in order to perform a flooding operation.

The search processor 540 sends the search result information to the forwarding process module 600 at step S138. The forwarding process module 600 receives the search result information and sends a frame at step S140. More specifically, the forwarding process module 600 reads out frame information accumulated in the buffer memory and sends a frame to all the output ports as output directions indicated by the search result information.

(A-4) Learning Process

Figure 15:
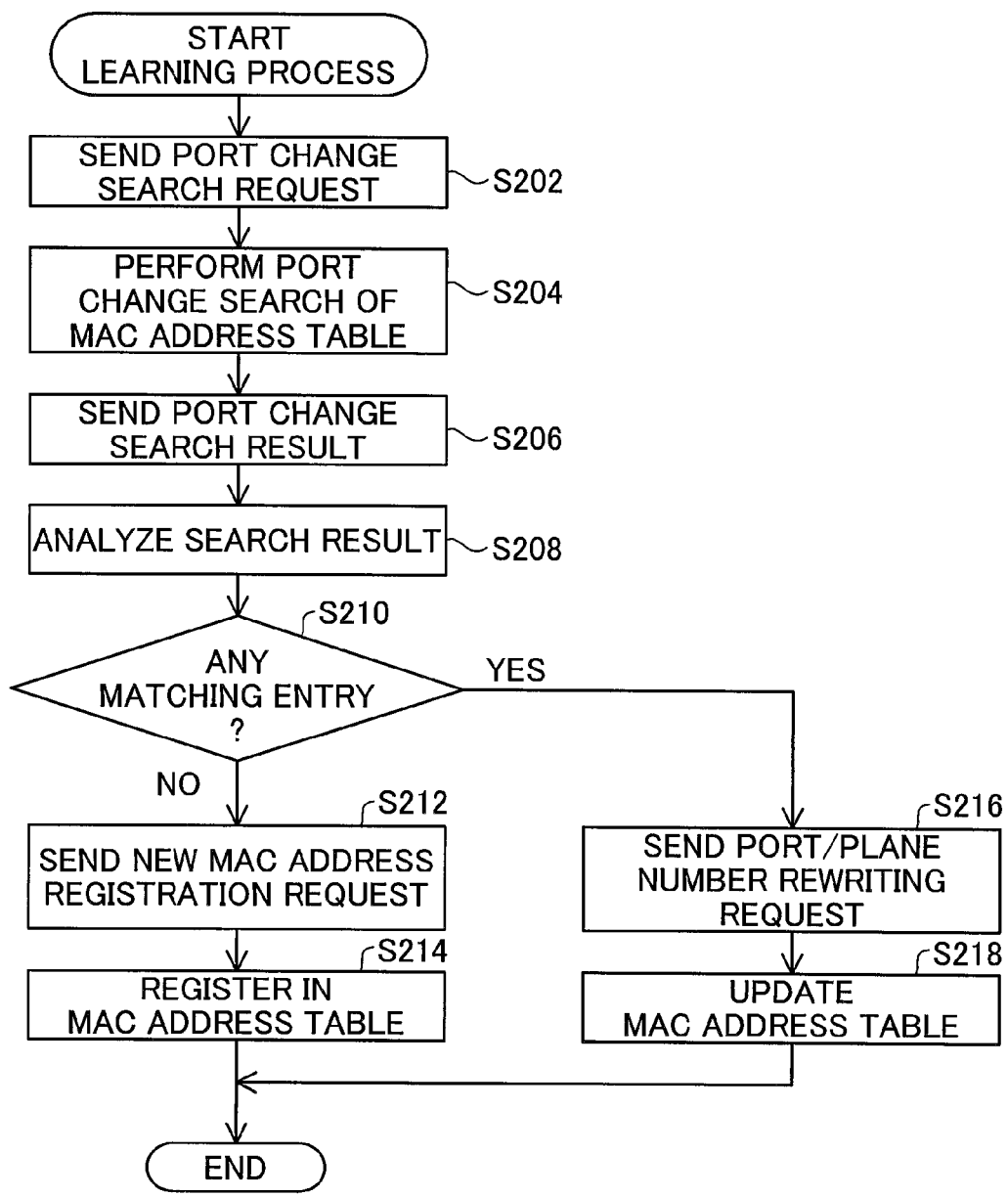
FIG. 15 is a flowchart showing the details of the learning process performed at step S120 in the flowchart of FIG. 8.

FIG. 15 is a flowchart showing the details of the learning process performed at step S120 in the flowchart of FIG. 8. The learning management module 400 sends a port change search request with port change search keys to the search processor 540 at step S202. Among the combination of learning search keys (the port number of the port receiving the frame FM, the intra-device VLAN number specified at step S108 (FIG. 8), the source MAC address FMA included in the layer 2 header L2HD, and the plane number specified at step S112 (FIG. 8)) notified to the learning management module 400 at step S118 in the flowchart of FIG. 8, the intra-device VLAN number specified at step S108 (FIG. 8) and the source MAC address FMA included in the layer 2 header L2HD are used as the port change search keys. In response to reception of the port change search request with the port change search keys, the search processor 540 performs a port change search of the MAC address table 570 (FIG. 12) at step S204. More specifically, the search processor 540 searches the MAC address table 570 for any matching entry with the port change search keys. The search processor 540 sends a result of the port change search (showing the presence or the absence of any matching entry) to the learning management module 400 at step S206. The learning management module 400 analyzes the received result of the port change search at step S208 and identifies whether there is any matching entry at step S210.

When there is no matching entry (step S210: No), the learning management module 400 sends a new MAC address registration request with the learning search keys as registration information to the search processor 540 at step S212. In response to reception of the new MAC address registration request, the search processor 540 newly registers the received registration information in the MAC address table 570 at step S214. When there is any matching entry (step S210: Yes), on the other hand, the learning management module 400 sends a port/plane number rewriting request to the search processor 540 at step S216. The port/plane number rewriting request is an update request of the MAC address table 570 using, among the combination of learning search keys, the intra-device VLAN number specified at step S108 (FIG. 8) and the source MAC address FMA included in the layer 2 header L2HD as search keys and the port number of the port receiving the frame FM and the plane number specified at step S112 (FIG.

8) as registration information. In response to reception of the port/plane number rewriting request, at step S218, the search processor 540 searches the MAC address table 570 for any matching entry with the received search keys and updates the registries in the plane number field MFO and in the port number field MPT of the matching entry respectively to the received plane number and the received port number.

In response to reception of a frame from an external device, the information of the received frame is additionally registered into the MAC address table 570 functioning as the MAC address storage, or the registry in the MAC address table 570 is updated with the information of the received frame. This arrangement enables the registries in the MAC address storage to be updated with the information of the received frame, thereby eliminating the flooding state at the earlier timing and reducing the network traffic.

FIG. 16 is an explanatory diagrammatic representation of one example of the control frame identification table 510. The control frame identification table 510 stores output direction information and direct notification information. The control frame identification table 510 has an intra-device VLAN number field FDSN, a port number field FDPN, a MAC address field FDMA, a layer 3 information field FDH3, a layer 4 information field FDH4, a frame output direction field FDPO, and a direct notification destination field FDNC. The intra-device VLAN number field FDSN has registries of identification codes of belonging VLANs as frame identification information. The port number field FDPN has registries of port numbers of ports receiving respective frames as the frame identification information. The MAC address field FDMA has registries of information to be registered in the destination MAC address field TMA of the received frame FM (FIG. 7) as the frame identification information. The layer 3 information field FDH3 has registries of information to be registered in the layer 3 header L3HD of the received frame FM as the frame identification information. The layer 4 information field FDH4 has registries of information to be registered in the layer 4 header L4HD of the received frame FM as the frame identification information. A symbol '*' registered in various conditional fields (intra-device VLAN number field FDSN, port number field FDPN, MAC address field FDMA, layer 3 information field FDH3, and layer 4 information field FDH4) represents that any condition is acceptable.

The frame output direction field FDPO as the output direction information stores at least one of information identifying either the requirement or non-requirement of discard of the received frame and information representing the forwarding destination of the received frame within the switch 10. The direct notification destination field FDNC stores at least one of information identifying the requirement or non-requirement of direct notification of the received frame to any of the protocol controllers 311 through 313 and information representing the notification destination among the protocol controllers 311 through 313 within the switch 10. For example, in the ring protocol of FIG. 1, direct notification is performed since the high-speed detection of a control frame is required. In this case, information representing the requirement of 'discard' is stored in the frame output direction field FDPO, and the identification code of a notification destination of the control frame selected among the protocol controllers 311 through 313 is stored in the direct notification destination field FDNC. In the STP (Spanning Tree Protocol), on the other hand, direct notification is not performed since the high-speed detection of a control frame is not required. In this case, the identification code of the protocol management module 300 is stored in the frame output direction field FDPO as the forwarding destination of the control frame. Information representing the non-requirement of direct notification is stored in the direct notification destination field FDNC. This series of processing will be discussed later in detail. These conditional fields are only illustrative and not restrictive, and the control frame identification table may be constructed to include any other suitable fields. For example, other pieces of information included in the frame FM may be added as conditional fields in the control frame identification table.

(A-5) Protocol Control Frame Detection Process

Figure 17:
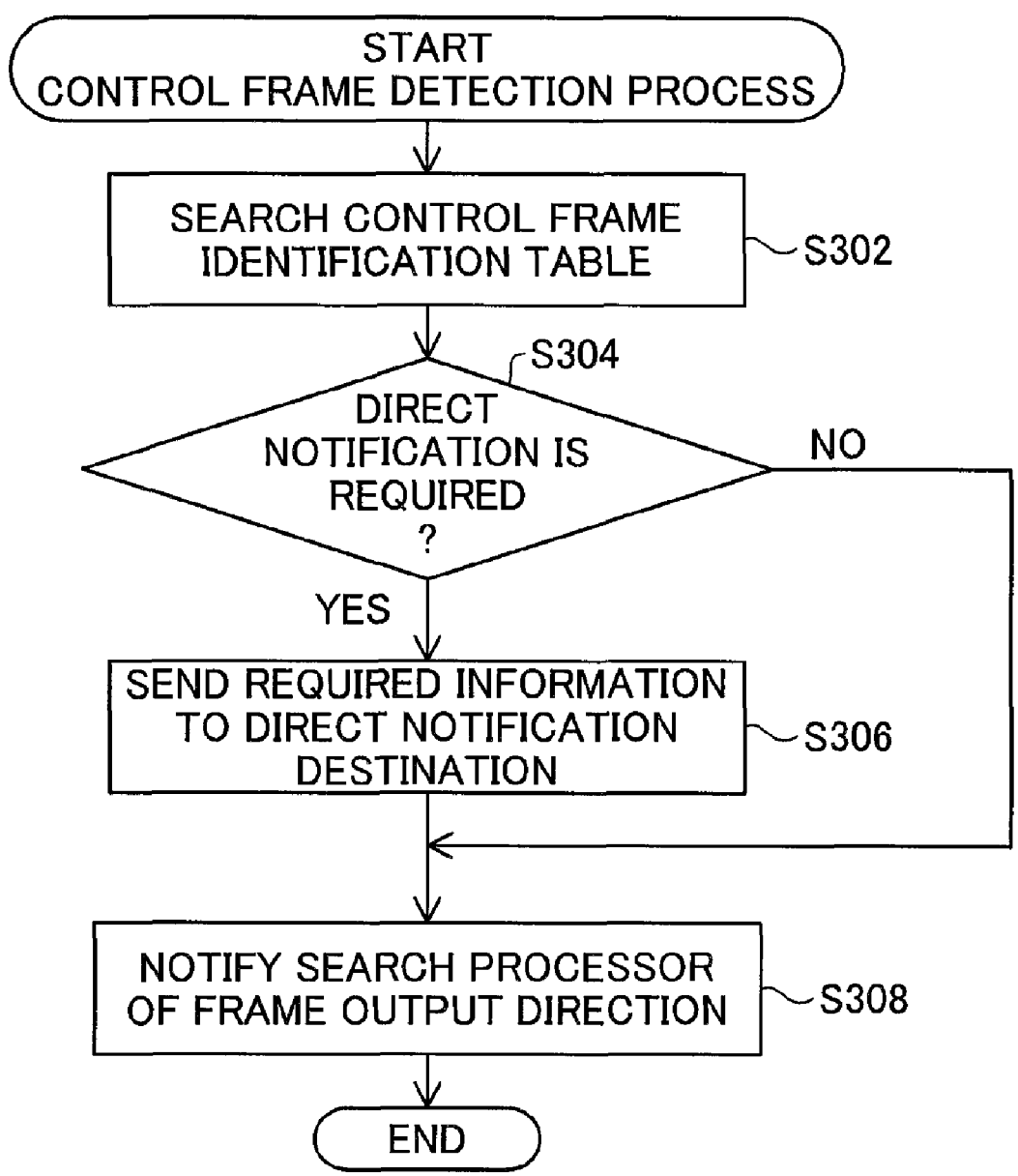
FIG. 17 is a flowchart showing the details of the protocol control frame detection process performed at step S110 in the flowchart of FIG. 8.

FIG. 17 is a flowchart showing the details of the protocol control frame detection process performed at step S110 in the flowchart of FIG. 8. The protocol control frame detection process is executed to detect a control frame. Typical examples of the control frame include the health check frame and the flash control frame described previously with reference to FIG. 3. At step S302, the protocol control frame detector 520 searches the control frame identification table 510. More specifically, the protocol control frame detector 520 searches the control frame identification table 510 (FIG. 16) for any matching entry with the intra-device VLAN number specified at step S108 (FIG. 8), the port number of the port receiving the frame FM, the destination MAC address TMA included in the layer 2 header L2HD, the information of the layer 3 header L3HD, and the information of the layer 4 header L4HD as keys. The protocol control frame detector 520 obtains the registries in the frame output direction field FDPO and the direct notification destination field FDNC of the matching entry.

At step S304, the protocol control frame detector 520 identifies the requirement or the non-requirement of direct notification, based on the registry in the direct notification destination field FDNC of the matching entry. Upon non-requirement of direct notification (step S304: No), the processing flow proceeds to step S308. Upon requirement of direct notification (step S304: Yes), on the other hand, the protocol control frame detector sends required information to the direct notification destination at step S306. More specifically, the protocol control frame detector 520 sends the port number of the port receiving the frame FM, the header information of the received frame, the intra-device VLAN number specified at step S108 (FIG. 8), and any other required pieces of information to the direct notification destination specified by the registry in the direct notification destination field FDNC. At subsequent step S308, the protocol control frame detector 520 notifies the search processor 540 of the registry in the frame output direction field FDPO. When the notified registry represents the requirement of 'discard', the search processor 540 notifies the forwarding process module 600 of the requirement of 'discard' and thereby causes the forwarding process module 600 to delete the relevant frame accumulated in the buffer memory. When the notified registry represents the identification code of the protocol management module 300, on the other hand, the search processor 540 notifies the forwarding process module 600 of the identification code and thereby causes the forwarding process module 600 to forward the relevant frame accumulated in the buffer memory to the protocol identifier 320.

This arrangement allows for the flexible processing corresponding to the characteristics of the communication protocols handled by the respective protocol controllers.

(A-6) Protocol Control Process

Figure 18:
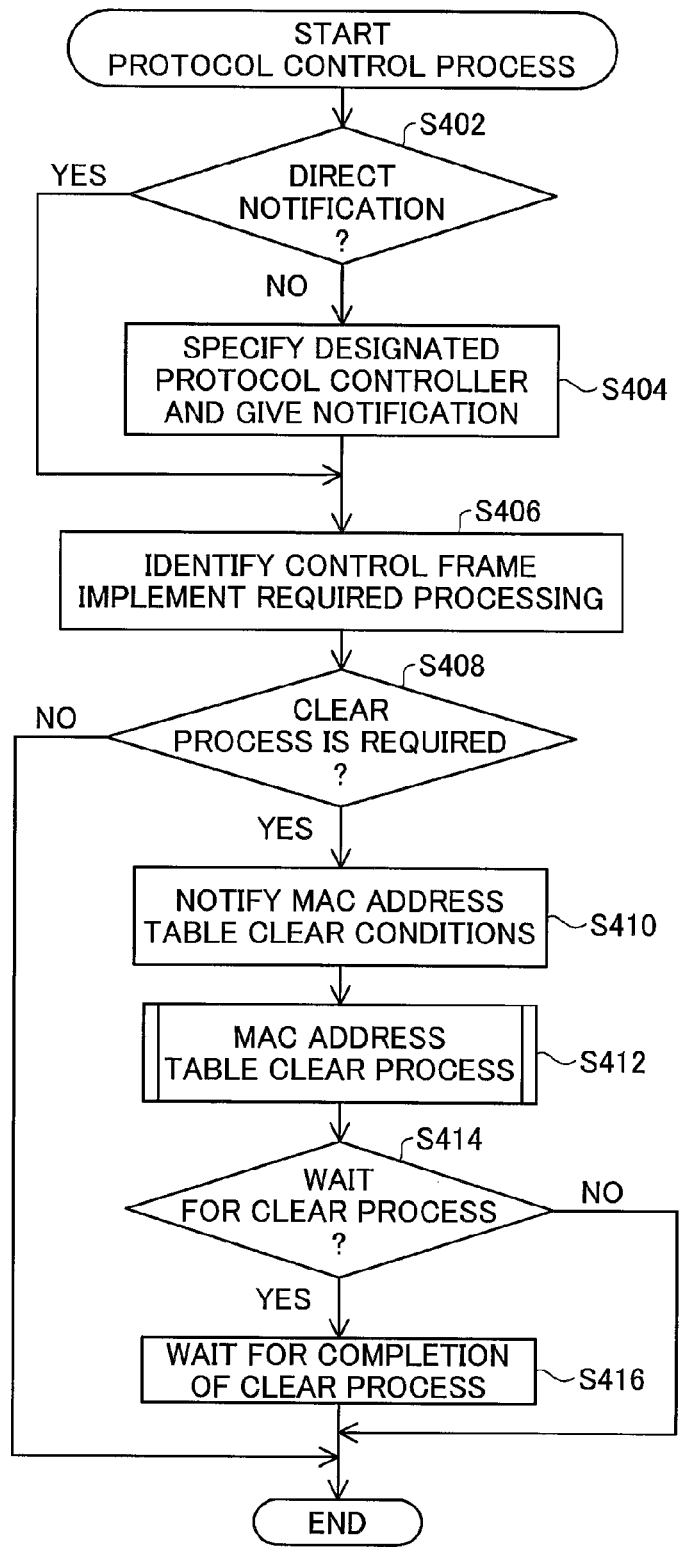
FIG. 18 is a flowchart showing a protocol control process that is performed by each of the protocol controllers in response to reception of a control frame FM.

FIG. 18 is a flowchart showing a protocol control process that is performed by each of the protocol controllers 311 through 313 in response to reception of a control frame FM. At step S402, the protocol identifier 320 of the protocol management module 300 identifies either implementation or non-implementation of direct notification. More specifically, the protocol identifier 320 identifies the non-implementation of direct notification in response to reception of the control frame forwarded from the forwarding process module 600, while identifying the implementation of direct notification in response to non-reception of the forwarded control frame. Upon identification of the implementation of direct notification (step S402: Yes), the processing flow proceeds to step S406. Upon identification of the non-implementation of direct notification (step S402: No), on the other hand, the protocol identifier 320 selects a designated protocol controller assigned to processing the received control frame FM among the protocol controllers 311 through 313 and gives notification to the selected protocol controller at step S404. More specifically, the protocol identifier 320 identifies the protocol of the received control frame FM according to the header information of the received control frame FM, the intra-device ULAN number specified at step S108 (FIG. 8), and the port number of the port receiving the control frame FM. The protocol identifier 320 then selects one of the protocol controllers 311 through 313 corresponding to the identified protocol as the designated protocol controller and gives notification to the designated protocol controller. In the description below, it is assumed that the protocol controller 311 receives the notification. The same series of processing described below is performed when the protocol controller 312 or the protocol controller 313 receives the notification.

At step S406, the protocol controller 311 identifies the type of the received control frame (for example, the health check frame or the flash control frame) and implements a required series of processing. On completion of the required processing, the protocol controller 311 determines whether a clear operation of the MAC address table 570 (discussed later) is required at step S408. Information representing the requirement or the non-requirement of the clear operation of the MAC address table 570 is registered in advance in the control frame. Upon non-requirement of the clear operation of the MAC address table 570 (step S408: No), the protocol control process is terminated. Upon requirement of the clear operation of the MAC address table 570 (step S408: Yes), on the other hand, the protocol controller 311 notifies the table management module 200 of the conditions used for the clear operation of the MAC address table 570 at step S410. The conditions used for the clear operation of the MAC address table 570 include a key item (an item 'port number' in this embodiment) used for deletion of information from the MAC address table 570 and an element of the key item (a 'concrete port number' in this embodiment) for identifying a target of information deletion from the MAC address table 570.

At subsequent step S412, the protocol controller 311 requests the table management module 200 to perform a MAC address table clear process. The details of the MAC address table clear process will be discussed later. The protocol controller 311 then determines whether to wait or not wait for completion of the MAC address table clear process at step S414. Upon determination of no wait for the MAC address table clear process (step S414: No), the protocol control process is terminated. Upon determination of wait for the MAC address table clear process (step S414: Yes), on the other hand, the protocol controller 311 waits for completion of the MAC address table clear process at step S416 and terminates the protocol control process.

Figures 19, 20:
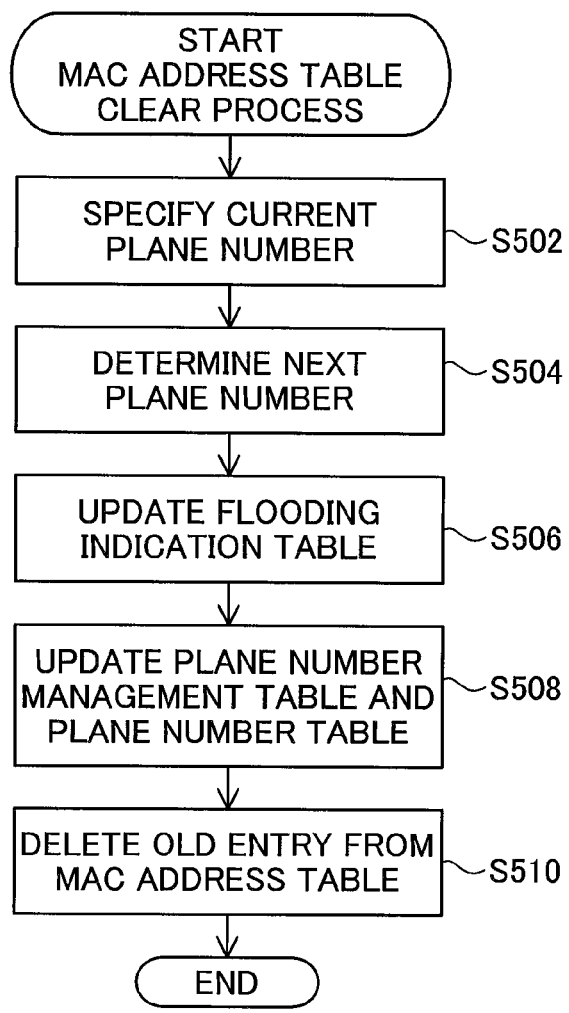
FIG. 19 is an explanatory diagrammatic representation of one example of the plane number management table.
FIG. 20 is a flowchart showing the details of the MAC address table clear process performed at step S412 in the flowchart of FIG. 18.

FIG. 19 is an explanatory diagrammatic representation of one example of the plane number management table 100. The plane number management table 100 stores the currently active plane numbers in correlation with the respective port numbers. The details of the plane number management table 100 are described previously with reference to FIG. 2A.

(A-7) MAC Address Table Clear Process

FIG. 20 is a flowchart showing the details of the MAC address table clear process performed at step S412 in the flowchart of FIG. 18. The table management module 200 specifies the currently active plane number as a current plane number Ma at step S502. More specifically, the table management module 200 searches the plane number management table 100 (FIG. 19) for any matching entry with the element of the key item (the concrete port number in this embodiment) notified at step S410 of FIG. 18 as a key and specifies the registry in the active plane number field FMNO of the matching entry as the current plane number Ma. At subsequent step S504, the table management module 200 determines a next plane number Mb to be used next. The next plane number Mb may be determined by adding a preset numeral (for example, 1) to the current plane number Ma. A list of candidates for the next plane number MB may be provided, and any arbitrary number may be selected from the list as the next plane number Mb. Any other suitable method may be adopted for determining the next plane number Mb. In the description below, the current plane number Ma may be referred to as current identification information, and the next plane number Mb may be referred to as next identification information.

At subsequent step S506, the table management module 200 updates the flooding indication table 580 (FIG. 13). More specifically, the following series of steps i and ii are performed to update the flooding indication table 580:

Step i) The table management module 200 searches the flooding indication table 580 for any matching entry with the current plane number Ma and the element of the key item (the concrete port number in this embodiment) notified at step S410 of FIG. 18 as keys, and changes the registry in the flooding indication field FIN of the matching entry to the indication symbol 'FLD' representing the requirement of flooding.

Step ii) The table management module 200 searches the flooding indication table 580 for any matching entry with the next plane number Mb and the element of the key item (the concrete port number in this embodiment) notified at step S410 of FIG. 18 as keys, and changes the registry in the flooding indication field FIN of the matching entry to the indication symbol '-' representing the non-requirement of flooding.

The table management module 200 then updates the plane number management table 100 (FIG. 19) and the plane number table 560 (FIG. 11) at step S508. More specifically, the table management module 200 searches the plane number management table 100 for any matching entry with the element of the key item (the concrete port number in this embodiment) notified at step S410 of FIG. 18 as a key, and updates the registry in the active plane number field FMNO of the matching entry to the next plane number Mb. The table management module 200 also searches the plane number table 560 for any matching entry with the same element of the key item, and updates the registry in the plane number field FNNO of the matching entry to the next plane number Mb.

At step S510, the table management module 200 deletes any old entry from the MAC address table 570 (FIG. 12). More specifically, the table management module 200 searches the MAC address table 570 for any matching entry with the current plane number Ma and the element of the key item (the concrete port number in this embodiment) notified at step S410 of FIG. 18 as keys, and deletes all the matching entries. Deletion of the old information from the MAC address table 570 desirably prevents the useless resource consumption of the non-required information. In addition to or in place of the processing at step S510, an aging operation may be performed to delete the non-required information.

The aging operation detects the use or the non-use of each MAC address entry in a relatively long time span and deletes any unused entry.

As described above, the table management module 200 changes the requirement or non-requirement of flooding registered in the flooding indication table 580, based on the element of the key item for identifying deletion target information of correlating the transmit port to the MAC address from the MAC address table 570 as the MAC address storage and the identification information for identifying an information group or a combination of information in the flooding indication table 580 as the flooding indication storage. The search processor 540 performs the flooding operation according to the registry in the flooding indication table 580. The flooding operation with regard to an entry as the target of information deletion in the MAC address table 570 can thus be performed at the earlier stage to eliminate the communication cut-off state. This arrangement effectively shortens the time period for recovery from a failure and assures the high reliability of the network relay apparatus. The MAC address table 570 has the registries of plane numbers as the identification information and is thus virtually correlated to the respective combinations of information in the flooding indication table 580. This results in saving the storage area in the MAC address table 570.

B. Second Embodiment

Figure 21:
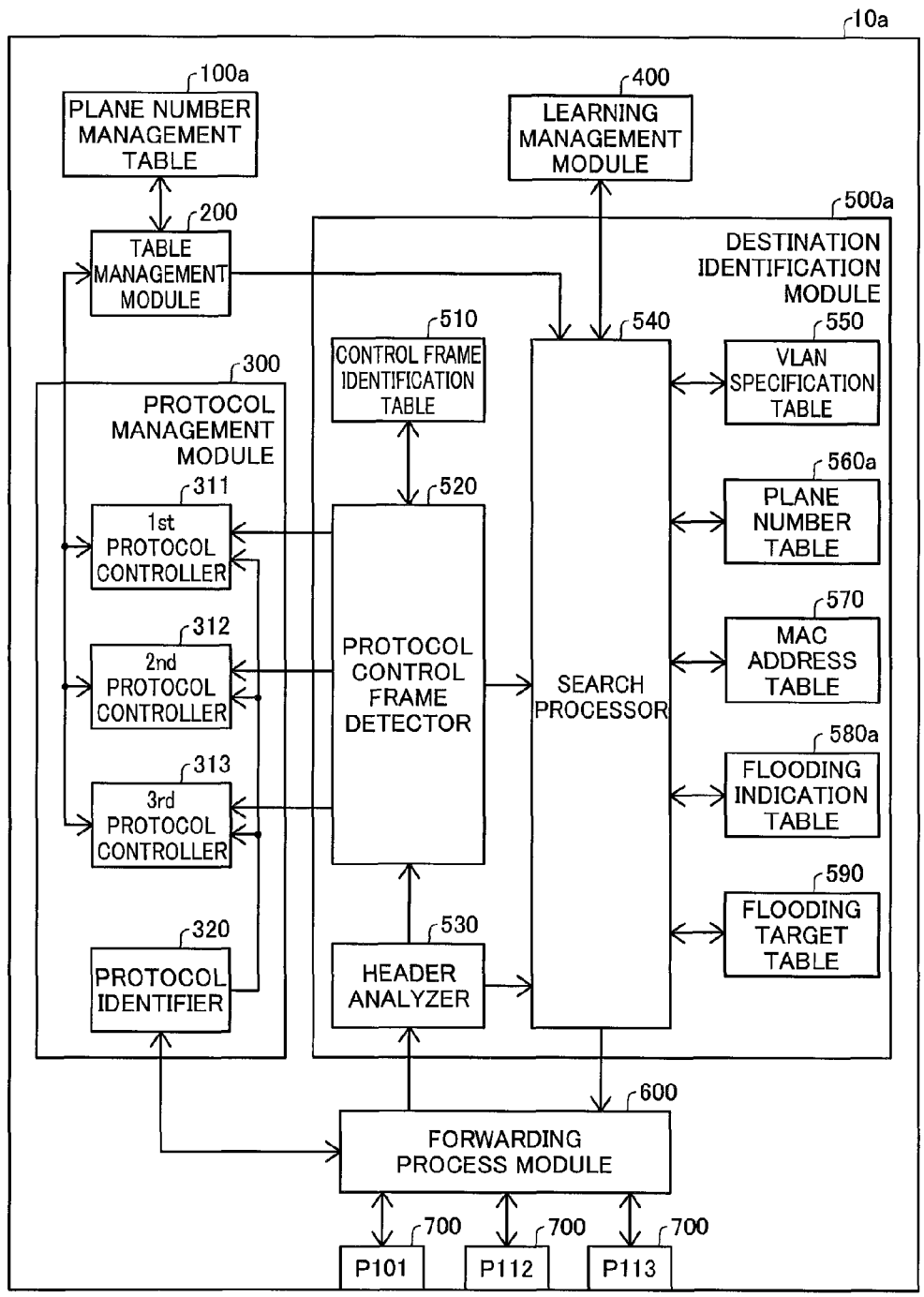
FIG. 21 is an explanatory diagrammatic representation of the general structure of a switch according to a second embodiment of the invention.

FIG. 21 is an explanatory diagrammatic representation of the general structure of a switch 10*a* according to a second embodiment of the invention. The switch 10*a* of the second embodiment basically has the similar structure to that of the switch 10 of the first embodiment described above with reference to FIG. 6, except that the plane number management table 100, the plane number table 560, and the flooding indication table 580 are replaced with a plane number management table 100*a*, a plane number table 560*a*, and a flooding indication table 580*a*.

FIG. 22 is an explanatory diagrammatic representation of one example of the plane number table 560*a* in the second embodiment. The only difference from the plane number table 560 of the first embodiment shown in FIG. 11 is an intra-device VLAN number field FNSN as the key item, instead of the port number field FNPT. Otherwise the structure of the plane number table 560*a* of the second embodiment is similar to that of the plane number table 560 of the first embodiment. The intra-device VLAN number field FNSN has registries of identification codes of intra-device VLANs individually specified for the respective received frames. In the second embodiment, the intra-device VLAN number is used as the key item for information deletion from the MAC address table 570. In the frame forwarding process of FIG. 8, at step S112, the search processor 540 searches the plane number table 560*a* for any matching entry with the intra-device VLAN number specified at step S108, instead of the port number of the port receiving the frame FM, as a key and specifies the registry in the plane number field FNNO of the matching entry as the plane number.

FIG. 23 is an explanatory diagrammatic representation of one example of the flooding indication table 580*a* in the second embodiment. The only difference from the flooding indication table 580 of the first embodiment shown in FIG. 13 is an intra-device VLAN number field FSN as the key item, instead of the port number field FPT. Otherwise the structure of the flooding indication table 580*a* of the second embodiment is similar to that of the flooding indication table 580 of the first embodiment. The intra-device VLAN number field FSN has registries of identification codes of intra-device VLANs individually specified for the respective received frames. In the frame forwarding process of FIG. 9, at step S128, the search processor 540 searches the flooding indication table 580*a* for any matching entry with the output plane number and the intra-device VLAN number specified at step S108 (FIG. 8), instead of the output port number specified at step S126, as keys and obtains the registry in the flooding indication field FIN of the matching entry.

FIG. 24 is an explanatory diagrammatic representation of one example of the plane number management table 100*a* in the second embodiment. The only difference from the plane number management table 100 of the first embodiment shown in FIG. 19 is an intra-device VLAN number field FMSN as the key item, instead of the port number field FMPT. Otherwise the structure of the plane number management table 100*a* of the second embodiment is similar to that of the plane number management table 100 of the first embodiment. The intra-device VLAN number field FMSN has registries of identification codes of intra-device VLANs individually specified for the respective received frames. In the protocol control process of FIG. 18, at step S410, the designated protocol controller (selected among the protocol controllers 311 through 313) corresponding to the protocol identified by, for example, the header information of the received control frame FM notifies the table management module 200 of a key item 'intra-device VLAN number' and an element 'concrete intra-device VLAN number' as the conditions used for the clear operation of the MAC address table 570.

In the second embodiment, the intra-device VLAN number is used as the key item, instead of the port number. The port number and the intra-device VLAN number are only illustrative examples of the key item. The key item may be set arbitrarily. For example, a link aggregation group number representing a link aggregation group may be used as the key item. In this case, the plane number table 560, the flooding indication table 580, the plane number management table 100, and the MAC address table 570 are modified to have a field having registries of link aggregation group numbers as in the case of the second embodiment using the intra-device VLAN number as the key item. The link aggregation group number is used as the search key in retrieval of the respective tables.

A combination of two or more items selected among the port number, the intra-device VLAN number, and the link aggregation group number may be set as the key items. This arrangement enables the key item to be set adequately according to the characteristics of the communication protocol implemented on the network relay apparatus.

C. Third Embodiment

Figure 25:
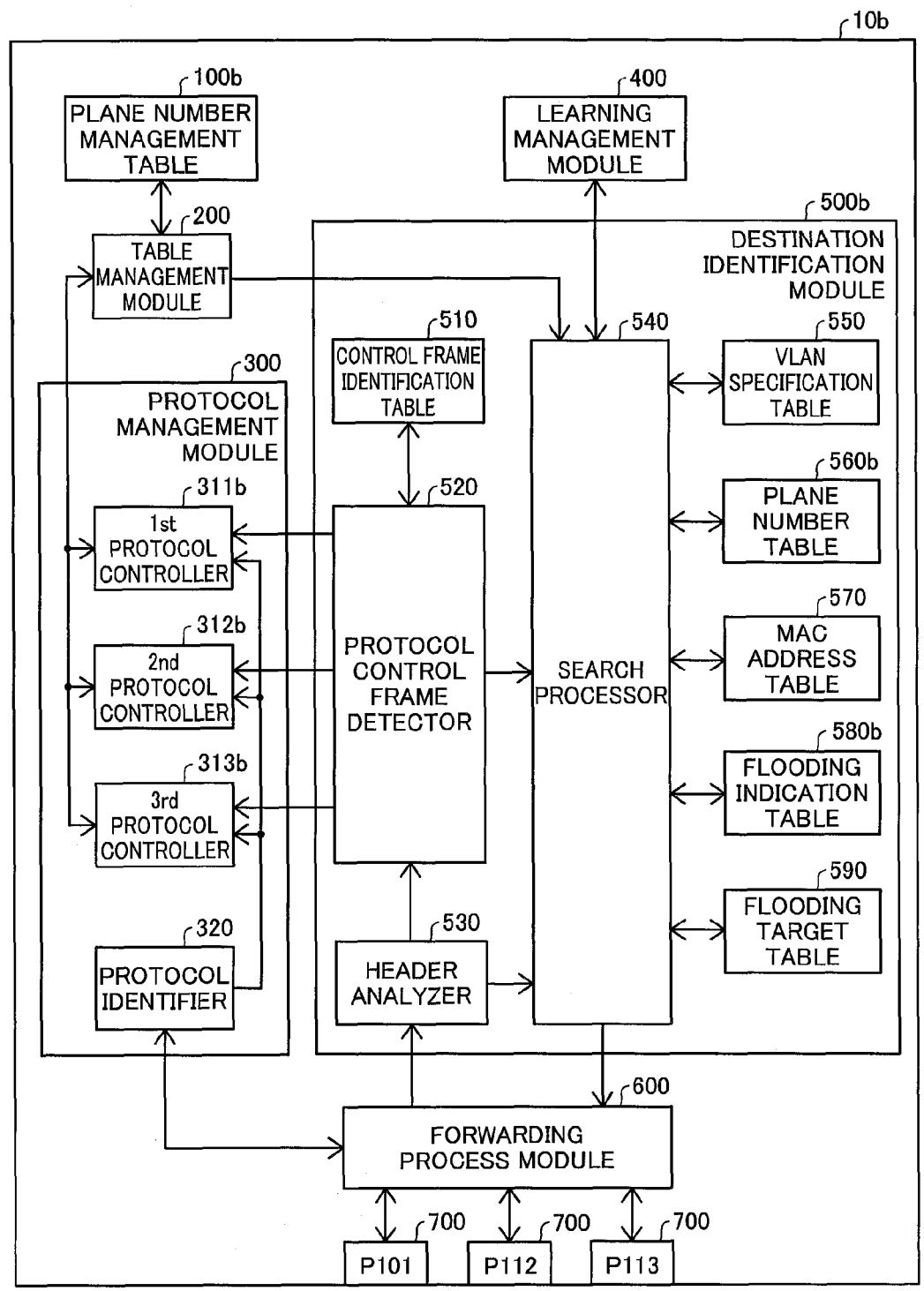
FIG. 25 is an explanatory diagrammatic representation of the general structure of a switch according to a third embodiment of the invention.

FIG. 25 is an explanatory diagrammatic representation of the general structure of a switch 10*b* according to a third embodiment of the invention. The switch 10*b* of the third embodiment basically has the similar structure to that of the switch 10 of the first embodiment described above with reference to FIG. 6, except that the plane number management table 100, the plane number table 560, the flooding indication table 580, and the protocol controllers 311 through 313 are replaced with a plane number management table 100*b*, a plane number table 560*b*, a flooding indication table 580*b*, and protocol controllers 311*b* through 313*b*. The key item is set for each of the protocol controllers 311*b*, 312*b*, and 313*b*, independently of the setting of the key items in the other protocol controllers. For example, the port number is set as the key item in the first protocol controller 311*b*, the intra-device VLAN number is set as the key item in the second protocol controller 312*b*, and the combination of the port number and the intra-device VLAN number is set as the key item in the third protocol controller 313b. In another example, the port number is set as the key item in the first protocol controller 311b, and the intra-device VLAN number is set as the key item in both the second protocol controller 312b and the third protocol controller 313b. The same key item may be set in multiple protocol controllers.

FIG. 26 is an explanatory diagrammatic representation of one example of the plane number table 560b in the third embodiment. The only difference from the plane number table 560 of the first embodiment shown in FIG. 11 is an intra-device VLAN number field FNSN as the key item, in addition to the port number field FNPT. Otherwise the structure of the plane number table 560b of the third embodiment is similar to that of the plane number table 560 of the first embodiment. In the frame forwarding process of FIG. 8, at step S112, the search processor 540 searches the plane number table 560b for any matching entry with at least one of the port number of the port receiving the frame FM and the intra-device VLAN number specified at step S108 as a key and specifies the registry in the plane number field FNNO of the matching entry as the plane number.

FIG. 27 is an explanatory diagrammatic representation of one example of the flooding indication table 580b in the third embodiment. The only difference from the flooding indication table 580 of the first embodiment shown in FIG. 13 is an intra-device VLAN number field FSN as the key item, in addition to the port number field FPT. Otherwise the structure of the flooding indication table 580b of the third embodiment is similar to that of the flooding indication table 580 of the first embodiment. In the frame forwarding process of FIG. 9, at step S128, the search processor 540 searches the flooding indication table 580b for any matching entry with the output plane number and at least one of the output port number specified at step S126 and the intra-device VLAN number specified at step S108 (FIG. 8) as keys and obtains the registry in the flooding indication field FIN of the matching entry.

FIG. 28 is an explanatory diagrammatic representation of one example of the plane number management table 100b in the third embodiment. The only difference from the plane number management table 100 of the first embodiment shown in FIG. 19 is an intra-device VLAN number field FMSN as the key item, in addition to the port number field FMPT. Otherwise the structure of the plane number management table 100b of the third embodiment is similar to that of the plane number management table 100 of the first embodiment. In the protocol control process of FIG. 18, at step S410, the designated protocol controller (selected among the protocol controllers 311b through 313b) corresponding to the protocol identified by, for example, the header information of the received control frame FM notifies the table management module 200 of a key item set in itself and information for identifying an element of the set key item as the conditions used for the clear operation of the MAC address table 570. For example, the designated protocol controller 311b notifies the table management module 200 of a key item 'port number' and an element 'concrete port number'. The table management module 200 performs the clear operation of the MAC address table 570 according to the key item and the relevant information notified by the designated protocol controller 311b (FIG. 20).

In the third embodiment, the key item is set for each of the protocol controllers 311b, 312b, and 313b, independently of the setting of the key items in the other protocol controllers. This arrangement is preferably applied to the network relay apparatus capable of controlling multiple different protocols and assures the similar effects to those of the first embodiment described above without changing the behaviors of the table management module 200.

D. Modifications

The invention is not limited to any of the embodiments and their applications discussed above but may be actualized in diversity of other embodiments and applications within the scope of the invention. Some examples of possible modification are given below.

D1. Modification 1

Each of the above embodiments describes the application of the invention to the ring network. The technique of the invention is, however, not restricted to the ring network but is applicable to diversity of other networks, for example, networks according to various protocols, such as STP (Spanning Tree Protocol), MSTP (Multiple Spanning Tree Protocol), PVSTP (Per Virtual LAN Spanning Tree Protocol), and GSRP (Gigabit Switch Redundancy Protocol).

D2. Modification 2

Each of the above embodiments describes the structure of the network relay apparatus. The structure of the network relay apparatus is, however, not restricted to these embodiments but may be changed and modified arbitrarily within the scope of the invention. For example, the network relay apparatus may be structured to have multiple search processors for performing the destination search, with a view to distributing the processing load. The network relay apparatus may be structured to have other adequate processors, in addition to or in place of those shown in FIG. 6. The number of the protocol controllers and the number of ports may be determined arbitrarily.

D3. Modification 3

The respective fields included in the plane number management table, the control frame identification table, the VLAN specification table, the plane number table, the MAC address table, the flooding indication table, and the flooding target table are described in the above embodiments. The fields included in these tables may be determined arbitrarily within the scope of the invention. For example, these tables may be structured to have other adequate fields, in addition to or in place of those described in the embodiments. The respective tables may be formed in the direct map format.

The embodiments and their modified examples discussed above are to be considered in all aspects as illustrative and not restrictive. There may be many other modifications, changes, and alterations without departing from the scope or spirit of the main characteristics of the present invention. Part or all of the structures and the functions actualized by the hardware devices, modules or units in the above embodiments may be accomplished by the software configuration. Part or all of the functions implemented by the software modules in the above embodiments may be accomplished by the hardware configuration. All changes within the meaning and range of equivalency of the claims are intended to be embraced therein. The scope and spirit of the present invention are indicated by the appended claims, rather than by the foregoing description.

What is claimed is:

1. A network relay apparatus, comprising:
multiple ports, each being provided to send and receive a frame to and from each of multiple external devices;
a MAC address storage configured to have registry of a transmit port selected among the multiple ports to be assigned to transmission of a frame to one of the multiple external devices, in correlation with a MAC address of the external device;
a flooding indication storage configured to have registry of an information group or combination of information of correlating a key item to requirement or non-requirement of a flooding operation, wherein the key item is used for deletion of information of correlating the transmit port to the MAC address from the MAC address storage;

a plane number management storage configured to have registry of identification information of identifying each information group, in correlation with the key item;

a table manager configured to utilize the plane number management storage to specify current identification information being currently used and next identification information to be used next, with regard to a preset element of the key item for identifying a target of deletion of the information of correlating the transmit port to the MAC address from the MAC address storage, the table manager setting the requirement of the flooding operation in registry of a certain information group in the flooding indication storage having the preset element and being correlated to the current identification information, and the table manager setting the non-requirement of the flooding operation in registry of a certain information group in the flooding indication storage having the preset element and being correlated to the next identification information; and a frame processor configured to utilize the flooding indication storage to perform the flooding operation.

2. The network relay apparatus in accordance with claim 1, the network relay apparatus further comprising:

a learning manager configured to perform a learning process with regard to the MAC address storage, wherein in response to reception of a frame from a certain external device, the frame processor utilizes the plane number management storage to retrieve identification information correlated to a frame-receiving port that receives the frame, the frame processor searches the MAC address storage for any registry of information matching with a combination of a MAC address of the certain external device, the frame-receiving port, and the identification information correlated to the frame-receiving port, the learning manager receives a result of the search by the frame processor, when the received result of the search represents no matching registry of information and the MAC address storage has no registry of the MAC address of the certain external device, the learning manager newly registers the combination of the MAC address of the certain external device, the frame-receiving port, and the identification information correlated to the frame-receiving port, into the MAC address storage, and when the received result of the search represents no matching registry of information and the MAC address storage has registry of the MAC address of the certain external device, the learning manager updates the MAC address storage with a combination of the frame-receiving port and the identification information correlated to the frame-receiving port, in correlation with the registry of the MAC address of the certain external device.

3. The network relay apparatus in accordance with claim 1, the network relay apparatus further comprising:

multiple protocol controllers configured to perform controls corresponding to types of communication protocols; and a protocol manager configured to manage the multiple protocol controllers, wherein each of the multiple protocol controllers notifies the table manager of a key item, which is set in advance independently of settings in other protocol controllers, the table manager utilizes the plane number management storage to specify current identification information being currently used and next identification information to be used next, with regard to a preset element of the notified key item for identifying a target of deletion of the information of correlating the transmit port to the MAC address from the MAC address storage, and the frame processor performing the flooding operation by causing the table manager to set the requirement of the flooding operation in registry of a certain information group in the flooding indication storage having the preset element and being correlated to the current identification information and to set the non-requirement of the flooding operation in registry of a certain information group in the flooding indication storage having the preset element and being correlated to the next identification information.

4. The network relay apparatus in accordance with claim 3, the network relay apparatus further comprising:

a control frame information storage configured to have registry of output direction information, which includes at least one of information representing requirement or non-requirement of discarding a control frame received from one of the external devices and information representing a forwarding destination within the network relay apparatus, and registry of direct notification information, which includes at least one of information representing requirement or non-requirement for direct notification of the received control frame to a designated protocol controller selected among the multiple protocol controllers and information representing a notification destination within the network relay apparatus; and a protocol control frame detector configured to specify the output direction information based on header information included in the received control frame and the registries in the control frame information storage and to induce an operation of discarding the control frame or a forwarding operation of forwarding the control frame to the protocol manager, the protocol control frame detector specifying the direct notification information based on the header information included in the received control frame and the registries in the control frame information storage, identifying implementation or non-implementation of direct notification of information of the control frame to a designated protocol controller selected among the multiple protocol controllers, and upon identification of the implementation of direct notification, notifies the designated protocol controller of the information of the control frame.

5. The network relay apparatus in accordance with claim 1, wherein the key item is selected among the group consisting of a port number, a VLAN number, a link aggregation group number, and combinations of two or more of the port number, the VLAN number, and the link aggregation group number.

6. A control method of a network relay apparatus, the control method comprising:

(a) storing registry of a transmit port selected among multiple ports, each being provided to send and receive a frame to and from each of multiple external devices, to be assigned to transmission of a frame to one of the multiple external devices, in correlation with a MAC address of the external device, into a MAC address storage;

(b) storing registry of an information group or combination of information of correlating a key item to requirement or non-requirement of a flooding operation, into a flooding indication storage, wherein the key item is used for deletion of information of correlating the transmit port to the MAC address from the MAC address storage;

(c) storing registry of identification information of identifying each information group, in correlation with the key item, into a plane number management storage;

(d) utilizing the plane number management storage to specify current identification information being currently used and next identification information to be used next, with regard to a preset element of the key item for identifying a target of deletion of the information of correlating the transmit port to the MAC address from the MAC address storage;

(e) setting the requirement of the flooding operation in registry of a certain information group in the flooding indication storage having the preset element and being correlated to the current identification information, while setting the non-requirement of the flooding operation in registry of a certain information group in the flooding indication storage having the preset element and being correlated to the next identification information; and (f) utilizing the flooding indication storage to perform the flooding operation.

7. A non-transitory computer readable storage medium for a network apparatus having computer readable program embodied in the medium, the computer readable program comprising:

a first program code for causing a computer to store registry of a transmit port selected among multiple ports, each being provided to send and receive a frame to and from each of multiple external devices, to be assigned to transmission of a frame to one of the multiple external devices, in correlation with a MAC address of the external device, into a MAC address storage;

a second program code for causing the computer to store registry of an information group or combination of information of correlating a key item to requirement or non-requirement of a flooding operation, into a flooding indication storage, wherein the key item is used for deletion of information of correlating the transmit port to the MAC address from the MAC address storage;

a third program code for causing the computer to store registry of identification information of identifying each information group, in correlation with the key item, into a plane number management storage;

a fourth program code for causing the computer to utilize the plane number management storage to specify current identification information being currently used and next identification information to be used next, with regard to a preset element of the key item for identifying a target of deletion of the information of correlating the transmit port to the MAC address from the MAC address storage;

a fifth program code for causing the computer to set the requirement of the flooding operation in registry of a certain information group in the flooding indication storage having the preset element and being correlated to the current identification information, while setting the non-requirement of the flooding operation in registry of a certain information group in the flooding indication storage having the preset element and being correlated to the next identification information; and a sixth program code for causing the computer to utilize the flooding indication storage to perform the flooding operation.

* * * * *